US009848358B2

(12) United States Patent
Somasundaram et al.

(10) Patent No.: US 9,848,358 B2
(45) Date of Patent: *Dec. 19, 2017

(54) APPARATUS TO ENABLE FALLBACK TO CIRCUIT SWITCHED DOMAIN FROM PACKET SWITCHED DOMAIN

(71) Applicant: InterDigital Patent Holdings, Inc., Wilmington, DE (US)

(72) Inventors: Shankar Somasundaram, Sunnyvale, CA (US); Mohammed Sammour, Amman (JO); Ulises Olvera-Hernandez, Kirkland (CA); Rajat Mukherjee, Toronto (CA); Catherine Livet, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,963

(22) Filed: Nov. 1, 2013

(65) Prior Publication Data

US 2014/0192772 A1 Jul. 10, 2014

Related U.S. Application Data

(63) Continuation of application No. 12/408,028, filed on Mar. 20, 2009, now Pat. No. 8,599,791.
(Continued)

(51) Int. Cl.
*H04W 36/00* (2009.01)
*H04W 80/10* (2009.01)

(52) U.S. Cl.
CPC ... *H04W 36/0022* (2013.01); *H04W 36/0033* (2013.01); *H04W 80/10* (2013.01)

(58) Field of Classification Search
USPC .................................................. 370/331
See application file for complete search history.

(56) References Cited

U.S. PATENT DOCUMENTS

| 5,444,764 A | 8/1995 | Galecki |
| 6,373,949 B1 | 4/2002 | Aura |

(Continued)

FOREIGN PATENT DOCUMENTS

| CN | 101005692 | 7/2007 |
| CN | 201499311 U | 6/2010 |

(Continued)

OTHER PUBLICATIONS

"Taiwan Office Action", Taiwan Application No. 100110227, Jul. 10, 2014, 6 pages.
(Continued)

*Primary Examiner* — Jenee Holland
(74) *Attorney, Agent, or Firm* — Eric Berkowitz

(57) ABSTRACT

An apparatus is used to perform a Circuit Switched (CS) fallback in wireless communications. The Non-Access Stratum (NAS) of the apparatus determines whether to perform a CS fallback based on an Internet Protocol (IP) Multimedia Subsystem (IMS) registration status, and sends a service request indicating a request to perform the CS fallback when the WTRU is attached to a CS domain. The apparatus also includes an Access Stratum (AS) that receives the CS service request from the NAS, sends an indication of the CS service request in a Radio Resource Control (RRC) message to an Evolved Universal Mobile Telecommunications System (UMTS) Terrestrial Radio Access Network (E-UTRAN), wherein the RRC message includes CS service information, and receives a handover command in response to the CS service request.

20 Claims, 8 Drawing Sheets

Related U.S. Application Data

(60) Provisional application No. 61/038,701, filed on Mar. 21, 2008.

(56) References Cited

U.S. PATENT DOCUMENTS

| | | | |
|---|---|---|---|
| 6,385,461 B1 | 5/2002 | Raith | |
| 6,542,499 B1 | 4/2003 | Murphy et al. | |
| 6,826,414 B1 | 11/2004 | Reynolds et al. | |
| 7,251,227 B2* | 7/2007 | de Jong et al. | 370/331 |
| 7,596,121 B2* | 9/2009 | De Jong et al. | 370/331 |
| 7,853,258 B2* | 12/2010 | Xu et al. | 455/435.1 |
| 8,139,530 B2* | 3/2012 | Herrero-Veron | 370/329 |
| 8,155,053 B2* | 4/2012 | Wang et al. | 370/328 |
| 8,190,191 B2* | 5/2012 | Livet et al. | 370/331 |
| 8,224,363 B2 | 7/2012 | Aghili et al. | |
| 8,374,635 B2 | 2/2013 | Harris | |
| 8,620,314 B2* | 12/2013 | Fok | H04B 17/26 455/435.1 |
| 2003/0179726 A1* | 9/2003 | Forssell | H04W 72/1236 370/328 |
| 2004/0057412 A1* | 3/2004 | Curcio | H04W 28/18 370/341 |
| 2004/0147262 A1* | 7/2004 | Lescuyer | H04W 36/0083 455/434 |
| 2004/0162077 A1* | 8/2004 | Kauranen et al. | 455/435.1 |
| 2004/0266435 A1* | 12/2004 | de Jong | H04W 36/14 455/436 |
| 2005/0003819 A1* | 1/2005 | Wu | H04W 36/0066 455/436 |
| 2005/0148348 A1* | 7/2005 | Cramby | H04W 68/12 455/458 |
| 2005/0169207 A1* | 8/2005 | Muniere | H04W 76/041 370/328 |
| 2005/0201337 A1* | 9/2005 | Heo | H04L 1/1845 370/335 |
| 2005/0261017 A1* | 11/2005 | Vaittinen | H04W 52/286 455/522 |
| 2006/0007861 A1* | 1/2006 | Kurzmann | H04W 76/022 370/235 |
| 2006/0023660 A1* | 2/2006 | Lejeune | H04W 24/02 370/328 |
| 2006/0056396 A1 | 3/2006 | Chao et al. | |
| 2006/0239229 A1* | 10/2006 | Marinescu | H04W 36/0022 370/331 |
| 2006/0256779 A1* | 11/2006 | Lim | H04L 29/06027 370/352 |
| 2006/0264217 A1 | 11/2006 | Shaheen | |
| 2006/0281459 A1* | 12/2006 | Marinescu | H04W 36/0022 455/436 |
| 2007/0041343 A1* | 2/2007 | Barreto | H04W 76/02 370/329 |
| 2007/0058791 A1* | 3/2007 | Liu | H04W 36/0022 379/88.17 |
| 2007/0097914 A1 | 5/2007 | Grilli et al. | |
| 2007/0117563 A1* | 5/2007 | Terry et al. | 370/331 |
| 2007/0121608 A1* | 5/2007 | Gu | H04L 12/6418 370/356 |
| 2007/0153793 A1 | 7/2007 | Jiang | |
| 2007/0165595 A1* | 7/2007 | Xu | H04W 76/02 370/350 |
| 2007/0177573 A1 | 8/2007 | Xu | |
| 2007/0238466 A1 | 10/2007 | Buckley et al. | |
| 2007/0259651 A1* | 11/2007 | Bae et al. | 455/412.1 |
| 2007/0297367 A1* | 12/2007 | Wang et al. | 370/331 |
| 2008/0032695 A1* | 2/2008 | Zhu | H04W 36/0022 455/442 |
| 2008/0039087 A1* | 2/2008 | Gallagher | H04W 8/04 455/435.2 |
| 2008/0045228 A1 | 2/2008 | Chandra et al. | |
| 2008/0064398 A1* | 3/2008 | Zhu | 455/435.1 |
| 2008/0080428 A1* | 4/2008 | Jappila | H04W 36/12 370/331 |
| 2008/0089272 A1* | 4/2008 | Ahokangas | H04W 48/18 370/328 |
| 2008/0089325 A1* | 4/2008 | Sung | H04W 36/30 370/389 |
| 2008/0095051 A1* | 4/2008 | Kim | H04W 92/14 370/229 |
| 2008/0192716 A1* | 8/2008 | Shaheen | 370/338 |
| 2008/0205381 A1* | 8/2008 | Zhu | G06Q 20/10 370/352 |
| 2008/0214193 A1* | 9/2008 | Jeong | H04W 74/004 455/436 |
| 2008/0220782 A1 | 9/2008 | Wang et al. | |
| 2008/0233947 A1* | 9/2008 | Herrero-Veron | 455/422.1 |
| 2008/0267153 A1 | 10/2008 | Mukherjee et al. | |
| 2008/0310378 A1 | 12/2008 | Kitazoe et al. | |
| 2009/0005048 A1* | 1/2009 | Bae | H04L 12/4633 455/439 |
| 2009/0069015 A1* | 3/2009 | Yamamoto | H04W 36/08 455/437 |
| 2009/0073936 A1* | 3/2009 | Jentz | H04W 36/0022 370/331 |
| 2009/0080382 A1* | 3/2009 | Chen | H04W 36/0016 370/331 |
| 2009/0086674 A1* | 4/2009 | Ejzak | 370/331 |
| 2009/0124212 A1* | 5/2009 | Islam et al. | 455/70 |
| 2009/0129342 A1 | 5/2009 | Hwang et al. | |
| 2009/0147754 A1* | 6/2009 | Long | H04M 7/123 370/331 |
| 2009/0168727 A1 | 7/2009 | Somasundaram et al. | |
| 2009/0170426 A1* | 7/2009 | Jung | H04W 8/24 455/7 |
| 2009/0185524 A1 | 7/2009 | Sammour et al. | |
| 2009/0201864 A1* | 8/2009 | Ahluwalia | H04W 72/1263 370/329 |
| 2009/0225725 A1* | 9/2009 | Zhu | H04W 36/0033 370/331 |
| 2009/0233600 A1* | 9/2009 | Johansson | H04W 36/14 455/435.2 |
| 2009/0238142 A1 | 9/2009 | Chun et al. | |
| 2009/0238143 A1 | 9/2009 | Mukherjee et al. | |
| 2009/0239533 A1 | 9/2009 | Somasundaram et al. | |
| 2009/0245496 A1* | 10/2009 | Maione | H04Q 3/0045 379/201.12 |
| 2009/0258631 A1* | 10/2009 | Forsberg | H04L 63/08 455/411 |
| 2009/0262682 A1 | 10/2009 | Khetawat et al. | |
| 2009/0265542 A1 | 10/2009 | Khetawat et al. | |
| 2009/0265543 A1 | 10/2009 | Khetawat et al. | |
| 2009/0270097 A1* | 10/2009 | Gallagher | H04W 8/08 455/435.1 |
| 2009/0270099 A1* | 10/2009 | Gallagher | H04W 8/08 455/435.1 |
| 2009/0270100 A1 | 10/2009 | Fukui et al. | |
| 2009/0270114 A1 | 10/2009 | Harris | |
| 2009/0275326 A1 | 11/2009 | Lee et al. | |
| 2009/0280814 A1* | 11/2009 | Farnsworth | H04B 17/327 455/436 |
| 2009/0285157 A1* | 11/2009 | Yeoum et al. | 370/328 |
| 2009/0296660 A1* | 12/2009 | Weng | H04W 36/0022 370/332 |
| 2009/0303971 A1* | 12/2009 | Kim | H04W 76/022 370/338 |
| 2009/0325634 A1 | 12/2009 | Bienas et al. | |
| 2010/0008329 A1* | 1/2010 | De Jong et al. | 370/331 |
| 2010/0054187 A1* | 3/2010 | Hallenstal et al. | 370/328 |
| 2010/0056156 A1* | 3/2010 | Xu et al. | 455/436 |
| 2010/0069119 A1 | 3/2010 | Mueck et al. | |
| 2010/0075670 A1 | 3/2010 | Wu | |
| 2010/0075698 A1 | 3/2010 | Rune et al. | |
| 2010/0085962 A1* | 4/2010 | Issaeva | H04W 76/041 370/355 |
| 2010/0097990 A1* | 4/2010 | Hallenstal et al. | 370/328 |
| 2010/0098023 A1* | 4/2010 | Aghili | H04W 36/0022 370/331 |
| 2010/0099402 A1* | 4/2010 | Wu | H04W 76/027 455/423 |
| 2010/0110945 A1 | 5/2010 | Koskela et al. | |

(56) References Cited

U.S. PATENT DOCUMENTS

| | | | |
|---|---|---|---|
| 2010/0130197 A1 | 5/2010 | Wu | |
| 2010/0142488 A1* | 6/2010 | Zhang | H04W 36/0022 370/332 |
| 2010/0165940 A1* | 7/2010 | Watfa | H04W 8/08 370/329 |
| 2010/0172301 A1 | 7/2010 | Watfa et al. | |
| 2010/0172323 A1* | 7/2010 | Rexhepi | H04W 36/0016 370/331 |
| 2010/0182971 A1* | 7/2010 | Chin | H04W 76/026 370/329 |
| 2010/0209625 A1 | 8/2010 | Bae | |
| 2010/0220680 A1* | 9/2010 | Ramankutty | H04W 68/08 370/329 |
| 2010/0234028 A1 | 9/2010 | Narasimha et al. | |
| 2010/0238799 A1* | 9/2010 | Sebire | H04M 15/8038 370/225 |
| 2010/0260099 A1* | 10/2010 | Frost et al. | 370/328 |
| 2010/0265914 A1* | 10/2010 | Song | H04W 48/18 370/331 |
| 2010/0272021 A1* | 10/2010 | Kopplin et al. | 370/328 |
| 2010/0279682 A1* | 11/2010 | Rangaiah | H04W 36/0088 455/426.1 |
| 2010/0279696 A1* | 11/2010 | Voyer | H04W 48/14 455/440 |
| 2010/0293265 A1* | 11/2010 | Lindholm | H04W 60/005 709/223 |
| 2010/0317315 A1* | 12/2010 | Burbidge | H04W 36/0022 455/404.1 |
| 2010/0329243 A1* | 12/2010 | Buckley | H04W 48/18 370/352 |

FOREIGN PATENT DOCUMENTS

| | | |
|---|---|---|
| EP | 1635585 | 3/2006 |
| EP | 1892897 | 2/2008 |
| EP | 1947889 | 7/2008 |
| GB | 2315193 | 1/1998 |
| GB | 2434942 A | 8/2007 |
| JP | 2006-081173 | 3/2006 |
| JP | 2007-184938 | 7/2007 |
| JP | 2010-528497 | 8/2010 |
| JP | 2011-500959 | 1/2011 |
| TW | 200814610 | 3/2008 |
| WO | WO-1998/49856 | 11/1998 |
| WO | WO-2000/030375 | 5/2000 |
| WO | WO-2005/115042 | 12/2005 |
| WO | WO-2007/037284 | 4/2007 |
| WO | WO-2007/053851 | 5/2007 |
| WO | WO-2007/137615 | 12/2007 |
| WO | WO 2007/144028 A1 | 12/2007 |
| WO | WO-2007/144592 | 12/2007 |
| WO | WO-2008/017421 | 2/2008 |
| WO | WO-2008/115447 | 9/2008 |
| WO | WO-2008/148432 | 12/2008 |
| WO | WO-2009/001269 | 12/2008 |
| WO | WO-2009/020361 | 2/2009 |
| WO | WO-2009/043002 | 4/2009 |
| WO | WO-2009/044318 | 4/2009 |
| WO | WO-2009/087099 | 7/2009 |
| WO | WO-2009/095777 | 8/2009 |
| WO | WO-2009/117588 | 9/2009 |
| WO | WO-2010/037053 | 4/2010 |

OTHER PUBLICATIONS

"Taiwan Office Action "English Translation"", Taiwan Application No. 100110227, Jul. 10, 2014, 4 pages.

"3rd Generation Partnership Project, Technical Specification Group Services and System Aspects, General Packet Radio Service (GPRS) enhancements for Evolved Universal Terrestrial Radio Access Network (E-UTRAN) access (Release 8)", 3GPP TS 23.401 V8.1.0, Mar. 2008, 172 pages.

"3rd Generation Partnership Project; Technical Specification Group Core network and Terminals; Mobile Radio Interface Layer 3 Specification; Core Network Protocols; Stage 3 (Release 6)", 3GPP TS 24.008 V6.18.0, Mar. 2008, 527 pages.

"3rd Generation Partnership Project; Technical Specification Group Core network and Terminals; Mobile Radio Interface Layer 3 Specification; Core Network Protocols; Stage 3 (Release 8)", 3GPP TS 24.008 V8.4.0, Dec. 2008, 571 pages.

"3rd Generation Partnership Project; Technical Specification Group Core Network and Terminals; Mobile Radio Interface Layer 3 Specification; Core Network Protocols; State 3 (Release 4)", 3GPP TS 24.008 V4.17.0, Sep. 2007, 460 pages.

"3rd Generation Partnership Project; Technical Specification Group Core Network and Terminals; Mobile Radio Interface Layer 3 Specification; Core Network Protocols; State 3 (Release 5)", 3GPP TS 24.008 V5.16.0, Jun. 2006, 488 pages.

"3rd Generation Partnership Project; Technical Specification Group Core Network and Terminals; Mobile Radio Interface Layer 3 Specification; Core Network Protocols; State 3 (Release 7)", 3GPP TS 24.008 V6.19.0, Jun. 2008, 527 pages.

"3rd Generation Partnership Project; Technical Specification Group Core Network and Terminals; Mobile Radio Interface Layer 3 Specification; Core Network Protocols; State 3 (Release 7)", 3GPP TS 24.008 V7.13.0, Sep. 2008, 550 pages.

"3rd Generation Partnership Project; Technical Specification Group Core Network and Terminals; Mobile Radio Interface Layer 3 Specification; Core Network Protocols; State 3 (Release 7)", 3GPP TS 24.008 V7.11.0, Mar. 2008, 645 pages.

"3rd Generation Partnership Project; Technical Specification Group Core Network and Terminals; Mobile Radio Interface Layer 3 Specification; Core Network Protocols; State 3 (Release 8)", 3GPP TS 24.008 V8.1.0, Mar. 2008, 551 pages.

"3rd Generation Partnership Project; Technical specification Group Core Network and Terminals; Non-Access Stratum (NAS) protocol for Evolved Packet System (EPS); Stage 3 (Release 8)", 3GPP TS 24.301 V8.0.0, Dec. 2008, 221 pages.

"3rd Generation Partnership Project; Technical specification Group Core Network and Terminals; Non-Access Stratum (NAS) protocol for Evolved Packet System (EPS); Stage 3 (Release 8)", 3GPP TS 24.301 V0.1.1, Mar. 2008, 63 pages.

"3rd Generation Partnership Project; Technical Specification Group Radio Access Network; Evolved Universal Terrestrial Radio Access (E-UTRA) Radio Resource Control (RRC); Protocol Specification", 3GPP TS 36.331 V8.4.0, Dec. 2008, 198 Pages.

"3rd Generation Partnership Project; Technical Specification Group Radio Access Network; Evolved Universal Terrestrial Radio Access (E-UTRA) Resource Control (RRC) Protocol Specification (Release 8)", 3GPP TS 36.331 V8.1.0, Mar. 2008, 122 pages.

"3rd Generation Partnership Project; Technical Specification Group Services and System Aspects; Architectural requirements (Release 5)", 3GPP TS 23.221 V5.11.0, Sep. 2004, 37 pages.

"3rd Generation Partnership Project; Technical Specification Group Services and System Aspects; Architectural requirements (Release 6)", 3GPP TS 23.221 V6.3.0, Jun. 2004, 39 pages.

"3rd Generation Partnership Project; Technical Specification Group Services and System Aspects; Architectural requirements (Release 7)", 3GPP TS 23.221 V7.2.0, Dec. 2007, 38 pages.

"3rd Generation Partnership Project; Technical Specification Group Services and System Aspects; Architectural requirements (Release 8)", 3GPP TS 23.221 V8.3.0, Dec. 2008, 40 pages.

"3rd Generation Partnership Project; Technical Specification Group Services and System Aspects; Architectural requirements (Release4)", 3GPP TS 23.221 V4.2.0, Jun. 2002, 28 pages.

"3rd Generation Partnership Project; Technical Specification Group Services and System Aspects; Circuit Switched Fallback in Evolved Packet System; Stage 2 (Release 8)", 3GPP TS 23.272 V1.0.0, Mar. 2008, 18 pages.

"3rd Generation Partnership Project; Technical Specification Group Services and System Aspects; Circuit Switched Fallback in Evolved Packet System; Stage 2 (Release 8)", 3GPP TS 23.272 V8.0.0, Jun. 2008, 41 pages.

(56) References Cited

OTHER PUBLICATIONS

"3rd Generation Partnership Project; Technical Specification Group Services and System Aspects; Circuit Switched Fallback in Evolved Packet System; Stage 2 (Release 8)", 3GPP TS 23.272 V8.2.0, Dec. 2008, 46 pages.
"3rd Generation Partnership Project; Technical Specification Group Services and System Aspects; Circuit Switched Fallback in Evolved Packet System; Stage 2 (Release 8)", 3GPP TS 23.272 V8.3.0, Mar. 2009, 47 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 8)", 3GPP TS 23.401 V8.0.0, Dec. 2007, 167 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 8)", 3GPP TS 23.401 V8.5.0, Mar. 2009, 223 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP TS 23.401 V9.0.0, Mar. 2009, 225 pages.
"3rd Generation Partnership Project; Technical Specification Group Services and System Aspects; General Packet Radio Service (GPRS); Service description; Stage 2 (Release 1999)", 3GPP TS 23.060 V3.17.0, Dec. 2006, 193 pages.
"3rd Generation Partnership Project; Technical Specification Group Services and System Aspects; General Packet Radio Service (GPRS); Service description; Stage 2 (Release 4)", 3GPP TS 23.060 V4.11.0, Dec. 2006, 199 pages.
"3rd Generation Partnership Project; Technical Specification Group Services and System Aspects; General Packet Radio Service (GPRS); Service description; Stage 2 (Release 5)", 3GPP TS 23.060 V5.13.0, Dec. 2012, 201 pages.
"3rd Generation Partnership Project; Technical Specification Group Services and System Aspects; General Packet Radio Service (GPRS); Service description; Stage 2 (Release 6)", 3GPP TS 23.060 V6.15.0, Dec. 2006, 209 pages.
"3rd Generation Partnership Project; Technical Specification Group Services and System Aspects; General Packet Radio Service (GPRS); Service description; Stage 2 (Release 7)", 3GPP TS 23.060 V7.8.0, Sep. 2008, 216 pages.
"3rd Generation Partnership Project; Technical Specification Group Services and System Aspects; General Packet Radio Service (GPRS); Service description; Stage 2 (Release 7)", 3GPP TS 23.060 V7.6.0, Dec. 2007, 217 pages.
"3rd Generation Partnership Project; Technical Specification Group Services and System Aspects; General Packet Radio Service (GPRS); Service description; Stage 2 (Release 8)", 3GPP TS 23.060 V8.4.0, Mar. 2009, 276 pages.
"Chinese First Office Action", Chinese Patent Application No. 200980110267.3, Oct. 9, 2012, 5 pages.
"Chinese First Office Action (English Translation)", Chinese Patent Application No. 200980110267.3, Oct. 9, 2012, 6 pages.
"European Search Report", EP Application No. 13162735.8, Apr. 11, 2014, 11 pages.
"European Search Report", EP Application No. 13162741.6, Apr. 11, 2014, 12 pages.
"European Second Office Action", European Patent Application 09 723 154.2, Sep. 2011, 5 pages.
"Japanese Notice of Rejection", Japanese Patent Application No. 2011-500959, Jan. 2012, 2 pages.
"Japanese Notice of Rejection", Japanese Patent Application No. 2011-072879, Mar. 2013, 2 pages.
"Japanese Notice of Rejection (English Translation)", Japanese Patent Application No. 2011-500959, Jan. 2012, 2 pages.
"Japanese Notice of Rejection (English Translation)", Japanese Patent Application No. 2011-072879, Mar. 2013, 2 pages.

"Mobile radio interface layer 3 specification; Core Network Protocols; Stage 3", 3GPP TS 24.008 V3.20.0, Dec. 2005, 450 pages.
"United States Non-Final Office Action", U.S. Appl. No. 12/408,028, Aug. 2011, 25 pages.
"United States Notice of Allowance", U.S. Appl. No. 12/408,028, Aug. 2013, 11 pages.
NTT DOCOMO, et al., "CS Fallback WID", 3GPP TSG SA WG2 Meeting#62, TD S2-080861, Marina Del Rey, California, USA, Jan. 14-18, 2008, 3 pages.
NTT DOCOMO, et al., "CS Fallback: Overview and Open Issues", 3GPP TSG-RAN WG2, R2-080027, Seville, Spain, Jan. 14-18, 2008, 3 pages.
Samsung, "PCFICH Mapping for One Transmitter Antenna", 3GPP TSG RAN WG1 #51bis, R1-080027, Sevilla, Spain, Jan. 14-18, 2008, 3 pages.
T-Mobile, et al., "Adding the "Subscriber Type" parameter to TS 23.401", 3GPP Tdoc S2-075640, 3GPP TSG SA WG2 Meeting #61, Ljubljana, Slovenia, Nov. 12-16, 2007, 12 pages.
"CS Fallback Consideration", R2-080874; 3GPP TSG-RAN WG2 Meeting #61; Sorrento Italy, Feb. 11-15 2008, 2 Pages.
"CS Fallback: Initial Trigger of CS Fallback in MO CS Call Case", C1-080670; 3GPP TSG CT WG1 Meeting #51-bis; Athens Greece, Feb. 19-21 2008, 7 Pages.
"Korean Office Action", Korean Application No. 10-2011-7008471, Jun. 2, 2014, 4 Pages.
"Korean Office Action (English Translation)", Korean Application No. 10-2011-7008471, Jun. 2, 2014, 5 Pages.
"Japanese Notice of Rejection", Japanese Application No. 2014-114910, Sep. 8, 2015, 3 pages.
"Japanese Notice of Rejection (English Translation)", Japanese Application No. 2014-114910, Sep. 8, 2015, 4 pages.
Huawei, et al., "Iu-CS based CS fallback architecture", 3GPP Tdoc S2-081755, 3GPP TSG SA WG2 Meeting #63, Athens, Greece, Feb. 18-22, 2008, 17 pages.
"Taiwanese Office Action", Taiwanese Application No. 098109159, Feb. 21, 2014, 3 pages.
"Taiwanese Office Action (English Translation)", Taiwanese Application No. 098109159, Feb. 21, 2014, 2 pages.
Ericsson, "UE Capability Transfer", 3GPP Tdoc R2-075515; 3GPP TSG-RAN WG2 Ad Hoc on LTE RRC, Vienna, Austria, Dec. 13-14, 2007, 7 pages.
U.S. Pat. No. 8,705,445, granted on Oct. 29, 2010.
U.S. Pat. No. 9,338,701, granted on Feb. 28, 2014.
United States Patent Publication No. 2016/0255544, published on Sep. 1, 2016.
"3rd Generation Partnership Project Technical Specification Group Radio Access Network RRC Protocol Specification (Release 1999)", 3GPP TS 25.331 V3.21.0, Dec. 2004, 879 pages.
"3rd Generation Partnership Project; Functions related to Mobile radio interface Layer 3 specification; Core network protocols; Stage 3 (Release 7)", 3GPP TS 24.008 V7.14.0, Mar. 2009, 550 pages.
"3rd Generation Partnership Project; Technical Specification Group Core Network and Terminals; Mobile radio interface Layer 3 specification; Core network protocols; Stage 3 (Release 8)", 3GPP TS 24.008 V8.3.0, Sep. 2008, 556 pages.
"3rd Generation Partnership Project; Technical Specification Group Radio Access Network; Mobility Procedures for Home NodeB; Overall Description; Stage 2 (Release 8)", 3GPP TS 25.367 V8.1.0, Mar. 2009, 11 pages.
"3rd Generation Partnership Project; Technical Specification Group Radio Access Network; Radio Resource Control (RRC); Protocol Specification (Release 4)", 3GPP TS 25.331 V4.20.0, Dec. 2008, 967 pages.
"3rd Generation Partnership Project; Technical Specification Group Radio Access Network; Radio Resource Control (RRC); Protocol Specification (Release 5)", 3GPP TS 25.331 V5.22.0, May 2008, 1,045 pages.
"3rd Generation Partnership Project; Technical Specification Group Radio Access Network; Radio Resource Control (RRC); Protocol Specification (Release 8)", 3GPP TS 25.331 V8.6.0, Mar. 2009, 1,673 pages.

(56) References Cited

OTHER PUBLICATIONS

"3rd Generation Partnership Project; Technical Specification Group Radio Access Network; Requirements for support of radio resource management (FDD) (Release 1999)", 3GPP TS 25.133 V3.22.0, Sep. 2005, 82 pages.

"3rd Generation Partnership Project; Technical Specification Group Radio Access Network; Requirements for support of radio resource management (FDD) (Release 4)", 3GPP TS 25.133 V4.17.0, Mar. 2006, 86 pages.

"3rd Generation Partnership Project; Technical Specification Group Radio Access Network; Requirements for support of radio resource management (FDD) (Release 5)", 3GPP TS 25.133 V5.18.0, Sep. 2007, 82 pages.

"3rd Generation Partnership Project; Technical Specification Group Radio Access Network; Requirements for support of radio resource management (FDD) (Release 6)", 3GPP TS 25.133 V6.24.0, Mar. 2009, 184 pages.

"3rd Generation Partnership Project; Technical Specification Group Radio Access Network; Requirements for support of radio resource management (FDD) (Release 7)", 3GPP TS 25.133 V7.14.0, Mar. 2009, 186 pages.

"3rd Generation Partnership Project; Technical Specification Group Radio Access Network; User Equipment (UE) procedures in idle mode and procedures for cell reselection in connected mode (Release 1999)", 3GPP TS 25.304 V3.14.0, Mar. 2004, 41 pages.

"3rd Generation Partnership Project; Technical Specification Group Radio Access Network; User Equipment (UE) procedures in idle mode and procedures for cell reselection in connected mode (Release 4)", 3GPP TS 25.304 V4.8.0, Mar. 2004, 41 pages.

"3rd Generation Partnership Project; Technical Specification Group Radio Access Network; User Equipment (UE) procedures in idle mode and procedures for cell reselection in connected mode (Release 5)", 3GPP TS 25.304 V5.9.0, Sep. 2005, 44 pages.

"3rd Generation Partnership Project; Technical Specification Group Radio Access Network; User Equipment (UE) procedures in idle mode and procedures for cell reselection in connected mode (Release 6)", 3GPP TS 25.304 V6.10.0, Mar. 2008, 38 pages.

"3rd Generation Partnership Project; Technical Specification Group Radio Access Network; User Equipment (UE) procedures in idle mode and procedures for cell reselection in connected mode (Release 7)", 3GPP TS 25.304 V7.7.0, Sep 2008, 41 pages.

"3rd Generation Partnership Project; Technical Specification Group Services and System Aspects; Service Accessibility (Release 7)", 3GPP TS 22.011 V7.9.0, Mar. 2008, 20 pages.

"English Language Abstract", Chinese Patent Publication No. 101005692.

Ericsson, et al., "LTE Home NB Text Proposal", 3GPP Tdoc R3-070714, 3GPP TSG RAN WG3 Meeting #55bis, St. Julian's, Malta, Mar. 27-30, 2007, 5 pages.

Huawei, "Cell Re-selection for hNB", 3GPP Tdoc R2-074831, 3GPP TSG RAN2 Meeting #60, Jeju, Korea, Nov. 5-9, 2007, 4 pages.

Huawei, et al., "Discussion on CSFB paging procedure when UE is in connected mode", 3GPP Tdoc C1-090100; 3GPP TSG CT WG1 Meeting #57; San Antonio (TX), USA, Feb. 9-19, 2009, 3 pages.

Huawei, "Discussion on the CLI for CS fallback", 3GPP Tdoc; C4-082700; 3GPP TSG CT WG4 Meeting #40-bis; Phoenix, U.S., Oct. 6-10, 2008, 3 pages.

Huawei, "Measurement Gap Scheduling in HO Procedure in LTE", 3GPP Tdoc R2-060860, 3GPP TSG RAN2 Meeting #52, Athens, Greece, Mar. 27-31, 2006, 3 pages.

Huawei, "Update the description of Paging for non-EPS services procedure", 3GPP Tdoc C1-083292; 3GPP TSG CT WG1 Meeting #55, Budapest, Hungary, Aug. 18-22, 2008, 3 pages.

Nokia, et al., "Pseudo-CR on introduction of Extended Service Request", 3GPP Tdoc C1084743; 3GPP TSG CT WG1 Meeting #55bis, Phoenix, Arizona (USA), Oct. 6-10, 2008, 12 pages.

Nokia Corporation, et al., "CSG Cell Identification for Mobility and Measurement Reporting", 3GPP Tdoc R2-073920, 3GPP TSG RAN WG2 Meeting #59bis, Shanghai, China, Oct. 8-12, 2007, 2 pages.

NTT DoCoMo, Inc., "Cell ID Assignment for Home Node B", 3GPP Tdoc R2-073374, 3GPP TSG RAN WG2 Meeting #59, Athens, Greece, Aug. 20-24, 2007, 5 pages.

QUALCOMM Europe, "Measurement and mobility issues for home (e)Node Bs", 3GPP Tdoc R2-074117, 3GPP TSG RAN WG2 Meeting #59bis, Shanghai, China, Oct. 8-12, 2007, 7 pages.

Samsung, "Measurement of home & private eNBs", 3GPP Tdoc R2-073307, 3GPP TSG RAN2 Meeting #59, Athens, Greece, Aug. 20-24, 2007, 5 pages.

Vodaphone Group, "Tracking Areas Concepts", 3GPP Tdoc R3-070112, 3GPP TSG RAN WG3 Meeting #55, St. Louis, USA, Feb. 12-16, 2007, 5 pages.

"3rd Generation Partnership Project; Functions related to Mobile radio interface Layer 3 specification; Core network protocols; Stage 3 (Release 7)", 3GPP TS 24.008 V7.15.0, Mar. 2010, 550 pages.

\* cited by examiner

APPARATUS TO ENABLE FALLBACK TO CIRCUIT SWITCHED DOMAIN FROM PACKET SWITCHED DOMAIN

CROSS REFERENCE TO RELATED APPLICATION(S)

This application is a continuation application of U.S. Non-Provisional patent application Ser. No. 12/408,028 filed Mar. 20, 2009, which claims the benefit of U.S. provisional application No. 61/038,701 filed Mar. 21, 2008.

TECHNOLOGY FIELD

This application is related to wireless communications.

BACKGROUND

The goal for the Third Generation Partnership Project (3GPP) Long Term Evolution (LTE) program is to provide improved spectral efficiency, reduced latency, and to enhance utilization of the radio resource to bring faster user experiences with reduced cost.

Since LTE is a Packet Switched (PS)-only radio technology that is initially likely to be supported only in packets, it is necessary to support backwards mobility with legacy Global System for Mobile communication (GSM), which is ubiquitous and may be assumed to exist everywhere. It was assumed that for inter-working with legacy Circuit Switched (CS) networks (such as GSM) operators would deploy Internet Protocol (IP) Multimedia Subsystem (IMS) networks. Specifically, Voice Call Continuity (VCC) was expected to be the technique used for handing over voice calls from LTE PS, using Voice Over Internet Protocol (VoIP) techniques, to legacy CS. However, it would also be desirable to de-couple IMS deployments from LTE deployments. In other words, operators would like to use their deployed CS infrastructure for voice calls while deploying LTE initially for high-speed PS services only. For this reason operators would like to see the initial release of LTE equipped with a feature (termed as "CS Fallback") which would allow a multi-mode wireless transmit/receive unit (WTRU) (LTE+GSM and/or WCDMA) to use the LTE network for high-speed PS data traffic while reverting to legacy CS network for voice traffic without necessarily using any IMS features such as VCC.

In general, when the WTRU attaches to the Evolved Packet System (EPS) over the Evolved Universal Mobile Telecommunications System (UMTS) Terrestrial Radio Access Network (E-UTRAN) network the Non Access Stratum (NAS) layer Attach message will include a "CS Fallback Indicator" that would indicate to the network the need to attach the WTRU in the CS domain as well. The Mobile Management Entity (MME) would then perform the attachment on behalf of the WTRU to the CS domain before indicating the completion of the process in the Attach Accept message as shown below.

FIG. 1 is a diagram of the procedure 100 for the CS fallback in the EPS. Referring to FIG. 1, the wireless transmit receive unit (WTRU) 110 initiates the attach procedure by the transmission of an Attach Request message 120 (e.g., CS fallback indicator message to the MME 130). The CS fallback indicator 120 indicates that the WTRU 110 is capable and configured to use CS fallback. An EPS Attach procedure 140, such as the procedure described in 3GPP TS 23.401, is then performed.

The visitor location register (VLR) (not shown) is updated according to the combined GPRS/IMSI Attach procedure, if the Attach Request message 120 includes a Combined Update indicator. The VLR number is derived from the International Atomic Time (IAT). The MME starts the location update procedure 150 towards the new Mobile Switching Caller (MSC)/VLR 160 upon receipt of the first Insert Subscriber Data message (not shown) from the Home Subscriber Service (HSS) 170. This operation marks the WTRU 110 as EPS-attached in the MSC/VLR.

The MME 130 then sends a Location Update Request (new Location Area Identity (LAI), IMSI, MME address, Location Update Type) message 180 to the VLR 160. New LAI is determined in the MME 130 based on mapping information from the TA (not shown). A mapped LAI could be for either GERAN or UTRAN based on an operator configuration. The VLR 160 creates an association 190 with the MME 130 by storing MME address. The VLR 160 performs Location Updating procedure 192 in CS domain. The VLR 160 responds with Location Update Accept 194 (VLR temporary mobile subscriber identity (TMSI)) to the MME 130. The MME 130 sends an Attach Accept (e.g., location area (LA), VLR TMSI) message 196 to the WTRU 110. The existence of LA and VLR TMSI indicates successful attach to CS domain.

Existing high-level signaling for preparing and executing fallback procedures for Mobile Originating (MO) and Mobile Terminating (MT) voice calls in Active Mode has several unresolved issues. For example, one issue is that some networks may support voice in LTE (using IMS/VCC) and some might not. Depending on the capabilities of the network, the telephony client in the WTRU application processor must determine whether to route MO calls to the PS domain (and request a PDP context activation from the ESM sub-layer in the NAS) or to the CS domain (and request a call to be setup).

Another unresolved issue is how call control in the WTRU is handled. If the call originated in the CS domain within the WTRU (because the network did not support IMS), the call would typically be routed to the CC/MM protocols within the WTRU and the EMM sub-layer would be unaware of the request.

Alternatively, if the WTRU started by using PS for voice it would use a VoIP client application which would request an IP address from the ESM layer (EPS Session Management) in the NAS. The ESM layer in turn would contact the EMM (EPS Mobility Management) layer which would interact with the RRC to setup the connection. At this point the LTE network would order the WTRU to "fall back" to the CS domain. However once the WTRU "falls back" to the CS domain, the call is now routed to the CS domain within the WTRU and the MM/CC protocols are responsible for this connection.

It would be desirable to provide this indication of "fallback complete" to the CS voice client and the Call control/ Mobility Management (CC/MM) protocols within the WTRU and transfer the call control from the VoIP client/ ESM/EMM to the CS call client/CC/MM. Accordingly, there exists a need for an improved method and apparatus to enable fallback to the CS domain from the PS domain.

SUMMARY

An apparatus for performing a Circuit Switched (CS) fallback in wireless communications. The Non-Access Stratum (NAS) of the apparatus determines whether to perform a CS fallback based on an Internet Protocol (IP) Multimedia Subsystem (IMS) registration status, and sends a service request indicating a request to perform the CS fallback when the WTRU is attached to a CS domain. The apparatus also includes an Access Stratum (AS) that receives the CS service request from the NAS, sends an indication of the CS service request in a Radio Resource Control (RRC) message to an Evolved Universal Mobile Telecommunications System (UMTS) Terrestrial Radio Access Network (E-UTRAN), wherein the RRC message includes CS service information, and receives a handover command in response to the CS service request.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (WTRU), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an enhanced Node-B (eNB), a site controller, an access point (AP), or any other type of interfacing device capable of operating in a wireless environment. In the embodiments described herein, the MSC/VLR may include an MCS, a VLR, or both.

Figure 1:
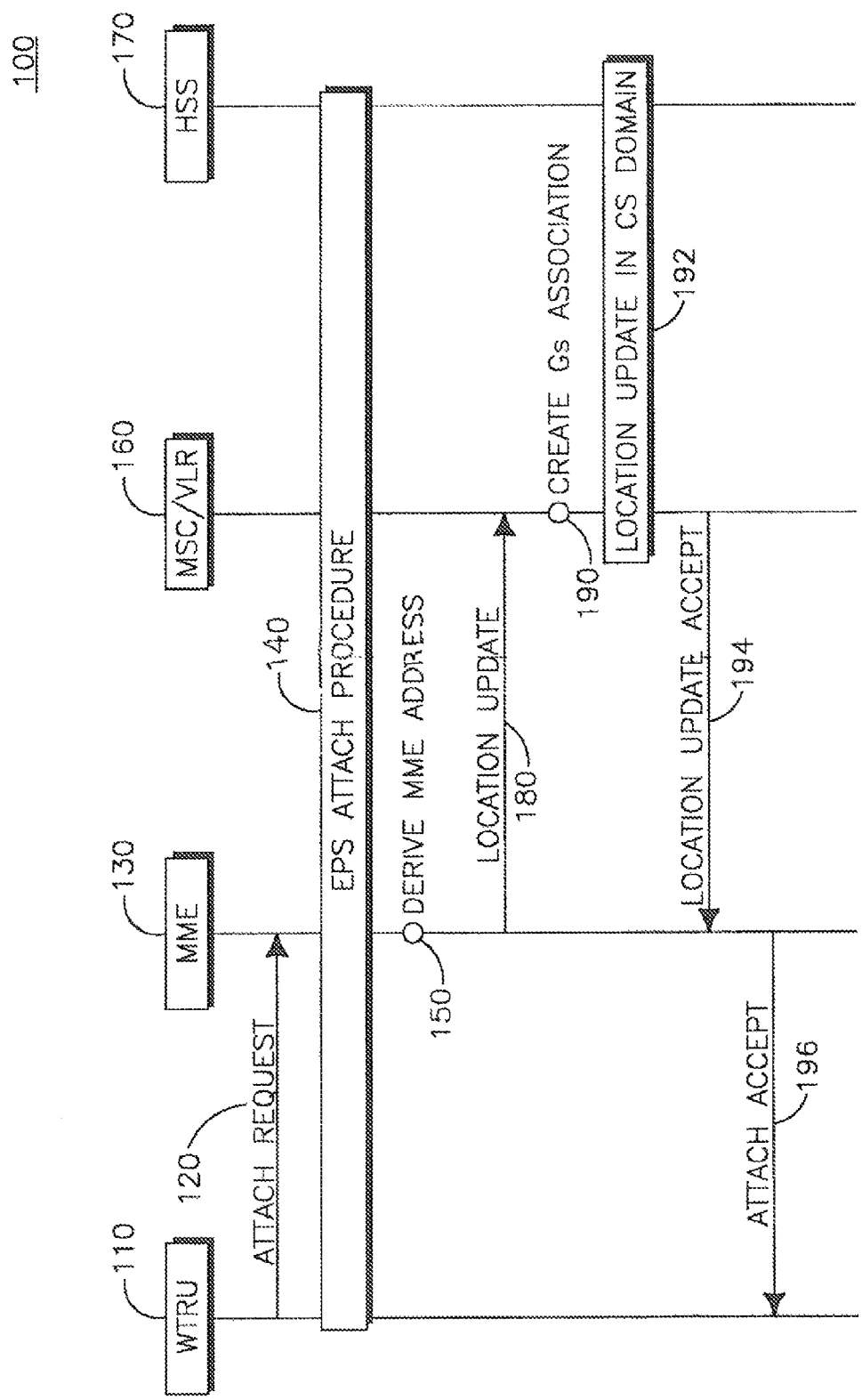
FIG. 1 is a diagram of an example attach program.
Figure 2:
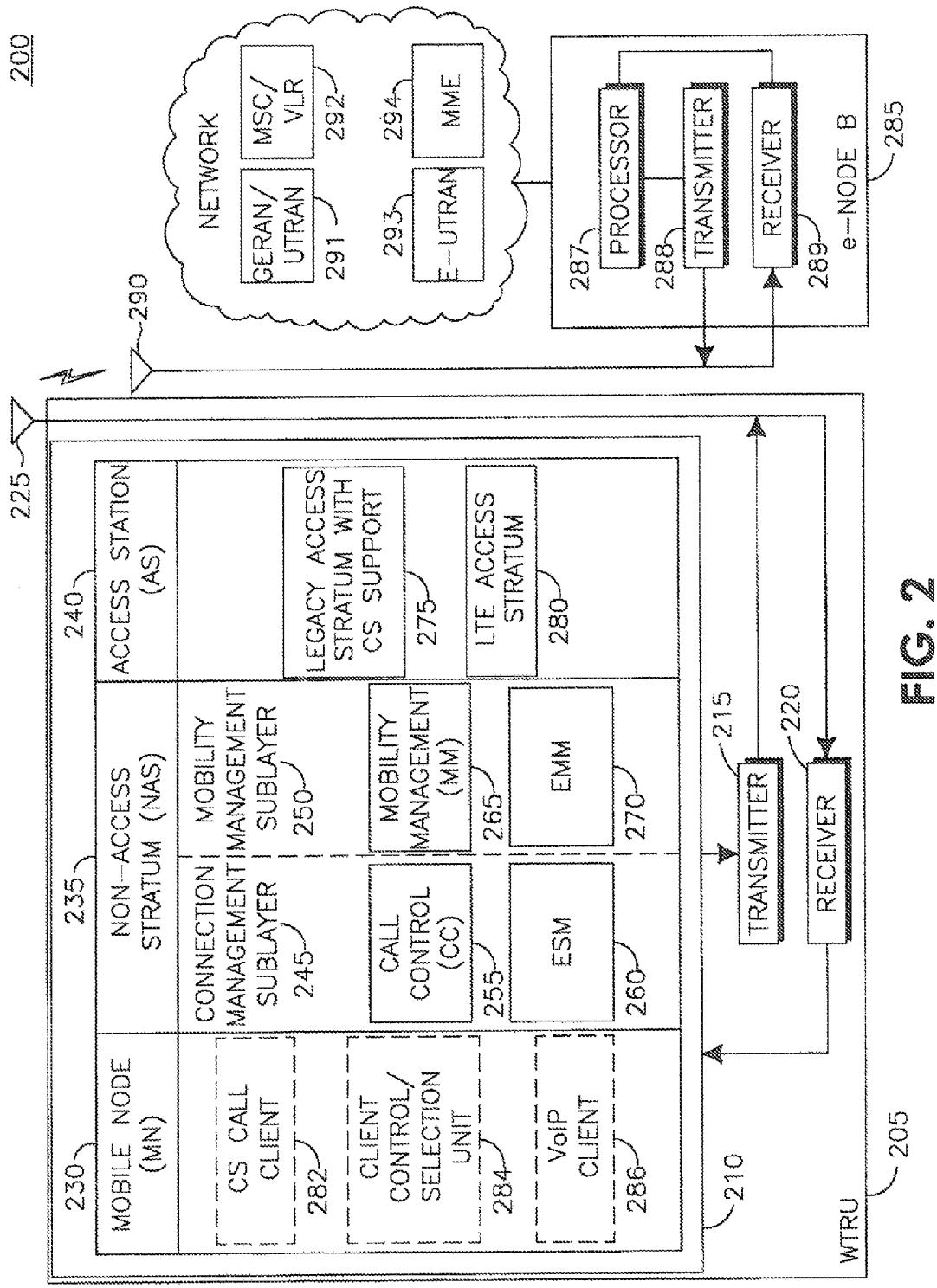
FIG. 2 is a diagram of an example WTRU and an e-Node B (eNB) configured to perform CS fallback.

FIG. 2 is a diagram of an example WTRU and an e-Node B (eNB) configured to perform CS fallback. The WTRU 205 comprises a processor 210, a transmitter 215, a receiver 220, and an antenna 225. The processor 210 includes a protocol stack comprising a Mobile Node 230 (MN), a Non-Access Stratum 235 (NAS), and an Access Stratum 240 (AS). The NAS 235 is divided into a connection management sub-layer 245 and a mobility management sub-layer 250. The connection management sub-layer 245 includes a call control (CC) unit 255 and an EPS session management (ESM) unit 260. The mobility management sub-layer 250 includes a mobility management (MM) unit 265 and an EPS mobility management (EMM) 270 unit. The AS 240 includes a legacy AS 275 that supports CS and an LTE AS 280. The MN 230 may optionally include a CS Call Client 282, a Client Control/Selection unit 284, and a VoIP Client 286.

Referring to FIG. 2, the e-Node B 285 (eNB) comprises a processor 287, a transmitter 288, a receiver 289, and an antenna 290. The enb 285 is configured to communicate with a GERAN/UTRAN unit 291, a MSC/VLR unit 292, an E-UTRAN unit 293, and a MME unit 294 in the network.

In accordance with the method and apparatus described herein, the LTE network has the ability to indicate to WTRUs whether it supports Single-Radio (SR)-VCC. This support automatically indicates to the terminal that the network supports VoIP and has the ability to handover a voice session to the circuit switched (CS) domain. This indication may be provided on the broadcast channel or on any RRC/NAS message. This indication may be accomplished, for example, by setting a single bit. Alternatively more bits may be used to indicate each feature separately, for example support for VoIP and/or support for IMS and/or support for SR-VCC.

Alternatively, the network may pre-configure a USIM in a UMTS IC Card (UICC) (not shown) or configure the USIM through an OMA device management protocol to indicate its capability, for example, using the selective disabling of 3GPP User Equipment Capabilities (SDoUE) feature as introduced in R7. The WTRU would then read the network capability through its USIM or through a Management Object (MO).

The method and the WTRU may have the ability to indicate to networks whether the WTRU supports Single-Radio VCC. This support may automatically indicate to the network that the WTRU supports VoIP, is IMS enabled, and has the ability to handover a voice session to the CS domain. This indication may be provided on any RRC/NAS message. This indication may be accomplished, for example, by setting a single bit. Alternatively more bits may be used to indicate each feature separately, for example support for VoIP and/or support for IMS and/or support for single-radio VCC.

The following four high-level example situations arise for multi-mode terminals. In the following examples, it is assumed that CS fall back is a mandatory feature supported by networks. The first situation arises for LTE Network and WTRU support for SR-VCC and VoIP. In this case, if the WTRU is on an LTE network and has a mobile originating (MO) call, it uses its VoIP client to setup the call. It may use the CS call client and fallback as directed by network. The decision to use the fall back procedure may be made either by the network or the WTRU. For example, the decision may be based on CS and PS resource availability, whether the WTRU has other PS services ongoing, or on network coverage. The decision may be made by the WTRU and based on, for example, the QoS expected for the Voice Call. When only low rate VoIP is available, the WTRU may decide to fall back to CS for increasing the call quality.

The second situation arises when the WTRU supports SR-VCC and VoIP over LTE, but the LTE network does not support SR-VCC and/or VoIP in LTE. In this case, if the WTRU is on the LTE network and has a MO call, it uses its CS call client to setup the call and uses the CS Fallback procedures, as defined later. In this example, the WTRU is aware of the network capabilities based on information received on the broadcast channel or on NAS messaging.

The third situation arises when the WTRU does not support SR-VCC and/or VoIP over LTE, but the LTE network does support SR-VCC and/or VoIP in LTE. In this example, if the WTRU is on the LTE network and has a MO call, it uses its CS call client to setup the call and uses the CS Fallback procedures as will be defined below.

The fourth situation arises when neither the WTRU nor the network support SR-VCC and/or VoIP over LTE. In this example, if the WTRU is on the LTE network and has a MO call, it uses its CS call client to setup the call and uses the CS Fallback procedures as will be defined below.

These four example methods also include receiving the capability notification as defined earlier. This capability notification may be provided to higher layer applications to enable the selection of the correct call client. New attention (AT) commands and other primitives for the exchange of this information between the modem (AS/NAS) and the application may also be included in this method.

The decision to fallback to CS, or the decision to initiate a call using the CS or PS domain call client, may be based on the IMS Registration status of the WTRU and may be made by the WTRU or the network. Accordingly, the method may include performing a call setup in the WTRU with EMM control. In this example, it is assumed that the network has no IMS support and that during the Initial Attach procedure the EMM sub-layer in the WTRU NAS is attached to the MME. As part of this method, the MM sub-layer may also be attached to the MSC/VLR in the CS domain by performing a Location Area Update. The MM sub-layer in the WTRU is thus in MM IDLE_NORMAL SERVICE state and the update status is U1, where U1 indicates that the last location updating attempt was successful. In general, the update status may indicate the state of the NAS sub-layers, and whether they have changed as a result of the location updating procedure.

Figure 3:
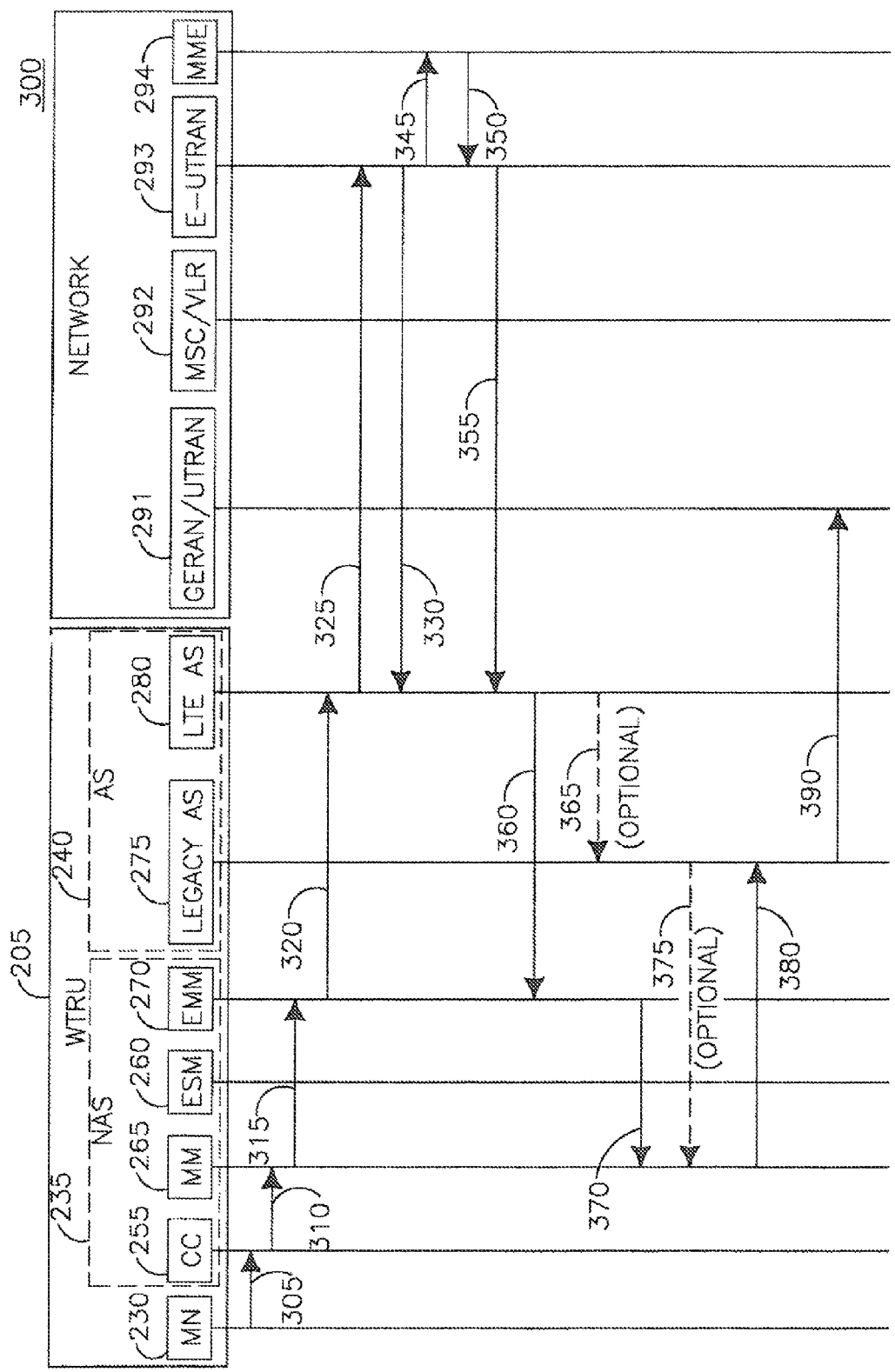
FIG. 3 is a signal flow diagram 300 of an example Mobile Originating (MO) call in Idle mode.

FIG. 3 is a signal flow diagram of a method 300 for Mobile Originating (MO) call in Idle mode. When a call is initiated in the CS domain while the WTRU is in Idle mode on LTE, the MM sub-layer 259 in the NAS 235 notifies the EMM sub-layer 270 of the NAS 235 of the request.

Referring to FIG. 3, an "MNCC_SETUP_REQ" primitive is sent 305 by the MN 230 to the CC 255 over a MNCC-SAP defined for the WTRU to initiate an MO establishment of a normal voice call. In response to receiving the "MNCC_SETUP_REQ" primitive, an "MMCC_EST_REQ" primitive is sent 310 by the CC 255 to the MM 265 over a MMCC-SAP, defined for the WTRU 205 to establish an MM connection. An "MMEMM_NOTIFY_REQ" primitive is sent 315 by the MM 265 to the EMM 270 to notify the EMM 270 of the MO CS call or MO CS service. The "MMEMM_NOTIFY_REQ" may be called by some other name without altering the basic concept.

The EMM 270 then sends 320 a Service Request to the LTE AS 280. The Service Request may be, for example, an MO CS service request or any other NAS EMM/ESM message with a similar intent to establish an S1 signaling connection with the MME 294. Included in the message sent is an indication "CS service" or some other cause value with a similar intent. The EMM 270 sends this message 320 to the LTE AS 280 after performing ciphering and/or integrity protection of the EMM message (not shown), if necessary. The EMM 270 may provide the LTE AS 280 with an indication of the originating CS service separate from the NAS message being sent and may also provide a description, such as whether it is conversational or streaming.

Alternatively, the MM layer 250 may indicate directly to the RRC layer of the LTE AS 280 of an MO CS service being initiated (not shown). This indication may include a description of the service (e.g., conversational, background).

In another alternative, the LTE AS 280, may initiate a cell reselection procedure and prioritize the selection priority of GERAN/UTRAN access (i.e. prioritize the Radio Access Technology (RAT) that supports CS service). Once the GERAN or UTRAN has been selected, the WTRU 205 may provide an indication of the fallback to CS cell to the NAS 235 disclosed below, or proceed to any later step.

Referring back to FIG. 3, the LTE AS 280 initiates 325 procedures to acquire an RRC Connection. This may involve a RACH access and an RRC CONNECTION REQUEST. The LTE AS 280 may set the establishment cause in the RRC CONNECTION REQUEST to a value that indicates an originating CS service. Although LTE is a PS only access technology, the AS may also set the Domain Indicator information element (IE) in the RRC CONNECTION REQUEST to the CS domain. The establishment cause may also provide details of the CS service (e.g. "Originating Streaming Call", "Originating Background Call" etc.).

In an alternative (not shown), a new RRC message called "EVENT NOTIFICATION" may be sent by the WTRU 205 after the RRC connection is established. This message indicates to the eNB 285 that an MO CS service request was received. The RRC may then start a timer after sending this message. If the timer expires before a HANDOVER FROM E-UTRAN COMMAND or equivalent message, or any other message as defined above is received the WTRU 205 may move to Idle mode and re-select to a cell with CS service available.

Once the RRC CONNECTION REQUEST is received with the cause value being set to "Originating CS service" or a cause with a similar intent, the eNB 285 may send 330 an RRC CONNECTION SETUP message to setup Signaling Radio Bearers (SRBs). The SETUP message may be, for example, a single bit and include an indication of eNB-initiated Relocation for CS services. If this indication is present, or based on some other parameters, the RRC layer in the WTRU 205 may decide not to try to initiate an uplink (UL) DIRECT TRANSFER procedure to send the upper layer NAS message. A T300 timer is started upon transmission of an RRC CONNECTION REQUEST. The timer is stopped when the WTRU 205 receives an RRC CONNECTION SETUP. If the timer expires and the WTRU 205 does not receive the RRC CONNECTION SETUP, the WTRU 205 may then retransmit the RRC CONNECTION REQUEST or abort the establishment procedure with the network if it has already transmitted a sufficient number of RRC CONNECTION REQUESTs.

The WTRU 205 may stop timer T300 when it receives the message and may start some other timer T1, which will help the WTRU 205 decide the duration of time it needs to wait before it goes back to idle. Alternatively, the eNB 285 may send a RRC CONNECTION REJECT message or some other RRC message which may include redirection info for the WTRU indicating the target RAT, the target frequency, or the target cell. In this alternative, the message may also indicate the initiation of the relocation. The WTRU 205, upon receiving this message would stop timer T300, move to Idle mode and re-select to the indicated RAT, frequency, or cell if indicated. If this is done, the WTRU RRC may send a variety of indications which will be discussed below. Another alternative includes sending a new RRC message called "EVENT NOTIFICATION RESPONSE", which indicates to the WTRU 205 that EVENT NOTIFICATION was received. This RRC message may be called by some other name without changing the principle. As such, when the WTRU 205 receives the EVENT NOTIFICATION RESPONSE message, the WTRU 205 may stop Timer T300 and start another timer which will help the WTRU 205 decide the amount of time it needs to wait before it switches to Idle mode.

Any combination of the above alternatives may be used. If an RRC Connection and SRBs were setup, the eNB 285 may initiate a measurement procedure so that it may determine to which cell to relocate the WTRU 205. Accordingly, the WTRU 205 may also perform measurements and send the measurement reports to the eNB 285.

The eNB 285 may then either send 345 the UPLINK NAS TRANSPORT message to the MME 294 with the WTRU NAS message or, after receiving an RRC CONNECTION REQUEST with the establishment cause set to originating CS service, send a RELOCATION REQUIRED message to the MME 294 with a description of the originating CS service.

The MME 294 then sends 350 a RELOCATION COMMAND after reserving resources for the originating CS service with the target MSC/NB/BS. Alternatively, the MME 294 may also send a NAS message to the WTRU 205 (e.g., SERVICE REJECT).

The eNB 285 then sends 355 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name, but which accomplishes a similar purpose. This RRC message may include an upper layer NAS message.

In response to receiving the Handover command, the RRC layer in LTE may provide an indication 360 of the fallback to CS cell to the NAS 235. This indication may also be used to send any received NAS message using a primitive. The RRC layer in LTE access 280 may also indicate 365 to the target access the parameters received in the handover. The target access may use these parameters to synchronize with the target cell. The target access may also confirm receiving the parameters or successful handover to the LTE access using a primitive. The EMM entity 270 may indicate 370 to the MM layer 265 that the terminal is now operating in the CS domain in A/Gb or Iu mode. The RRC, or equivalent layer in target access, may provide 375 an indication of the fallback to CS cell to the NAS 235 via a primitive.

The responses to receiving the Handover command may be in any order and are not intended to be sequential, and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify a CS fallback command received, initiated, or completed.

The WTRU NAS 235 is operating 380 in A/Gb or Iu mode and the MM layer is active. As such, it may initiate 385 call setup procedures as per usual with the access stratum of the target access, which is now the current access. The RRC, or equivalent layer of the target (now current) access, may begin 390 its defined procedures for receiving a MO CS Call request.

Figure 4:
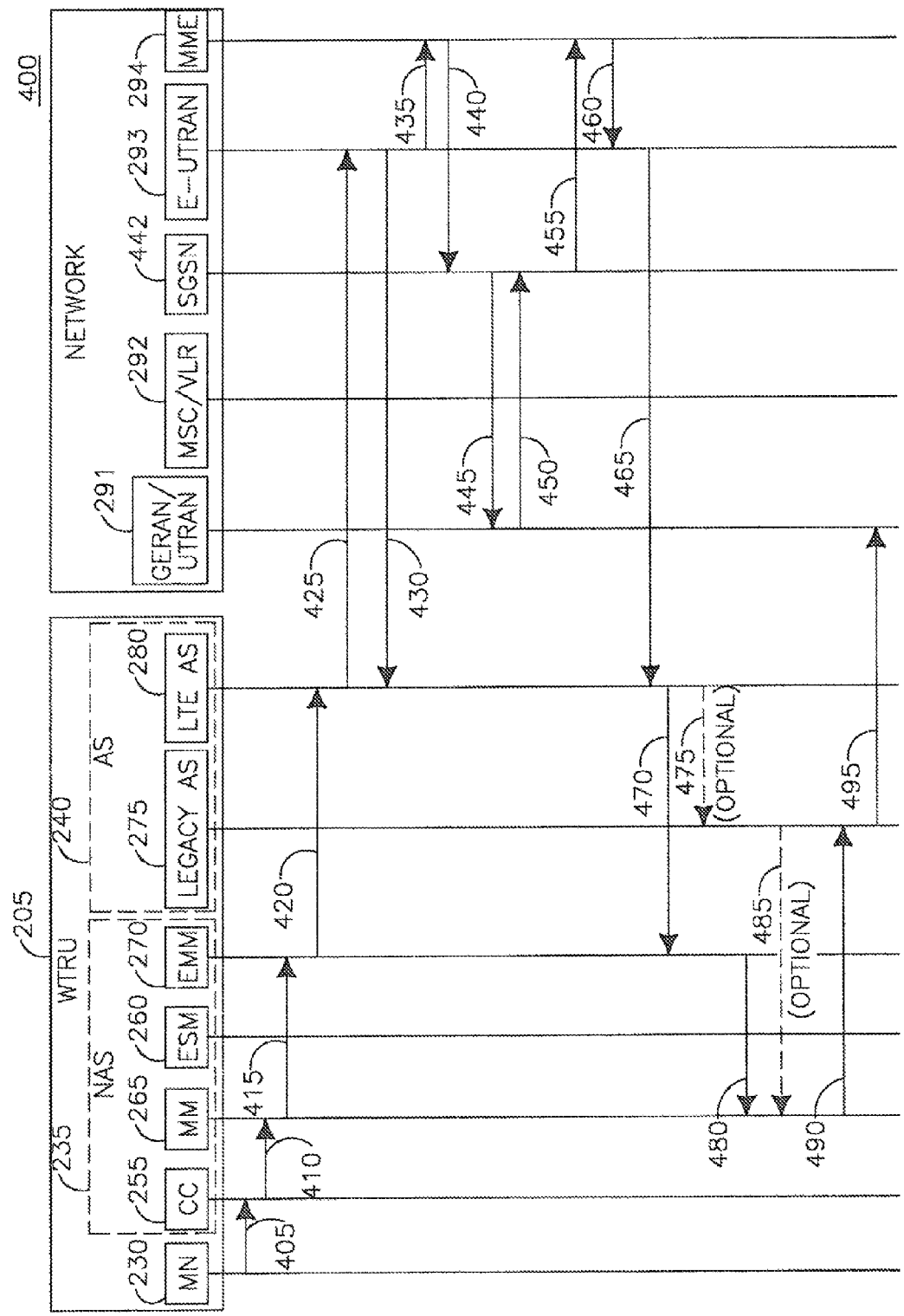
FIG. 4 is a signal flow diagram of an example MO Call setup in Active Mode with ongoing packet session.

FIG. 4 is a signal flow diagram of a method 400 for MO Call setup in Active Mode with ongoing packet session. This example includes that for Mobile Originating (MO) calls in Idle mode. When a call is initiated in the CS domain while the WTRU is in Idle mode on LTE, the MM sub-layer 265 in the NAS 235 notifies the EMM sub-layer 270 (of the NAS) of the request.

Referring to FIG. 4, an "MNCC_SETUP_REQ" primitive is sent 405 by the MN 230 to the CC 255 over the MNCC-SAP defined for the WTRU 205 to initiate an MO establishment of a normal voice call. In response to receiving the "MNCC_SETUP_REQ" primitive, a "MMCC_EST_REQ" primitive is sent 410 by the CC to the MM 265 over the MMCC-SAP defined for the WTRU 205, to establish an MM connection. An "MMEMM_NOTIFY_REQ" is sent 415 by MM 265 to the EMM 270 to notify the EMM 270 of the MO CS call or MO CS service. "MMEMM_NOTIFY_REQ" may be called by some other name without altering the basic concept.

The EMM 270 then sends 420 a Service Request to the LTE AS 280. The Service Request may be, for example, an MO CS service request or any other NAS EMM/ESM message with a similar function to establish a S1 signaling connection with the MME 294. Included in the message sent, is an indication "CS service" or some other cause value with a similar intent. The EMM 270 sends this message to the LTE AS 280 after performing ciphering and/or integrity protection of the EMM message, if necessary. The EMM 270 may provide the LTE AS 280 with an indication of the originating CS service separate from the NAS message being sent and may also provide a description (e.g., conversational, streaming etc.). Alternatively, the MM layer 265 may indicate directly to the RRC layer of the LTE AS 280 of a MO CS service being initiated (not shown). This indication may include a description of the service, for example whether it is conversational or background.

The LTE AS 280 then notifies 425 the eNB 285 of the MO CS service request along with a description of the CS service such as "Originating Streaming Call" or "Originating Background Call". An RRC message called "EVENT NOTIFICATION" indicates to the eNB 285 that a MO CS service request was received. The RRC may then start a timer after sending this message. If the timer expires before a HANDOVER FROM E-UTRAN COMMAND or equivalent message or any other message as defined below, is received, the WTRU 205 then may move to idle mode and re-select to a cell with CS service available.

As an alternative, the notification of the MO CS service request may be carried in any other RRC message, for example as part of measurement reporting or UL DIRECT TRANSFER) and may include details of the CS service. The details of the CS service may include, for example "Originating Streaming Call" or "Originating Background Call".

Once the eNB 285 receives notification of the MO CS service request, the eNB 285 may send 430 an "EVENT NOTIFICATION CONFIRM" message to confirm initiation of the Relocation procedure. This message may also instruct the WTRU 205 to perform measurements on neighboring cells of other RAT. Alternatively, the eNB 285 may send a MEASUREMENT COMMAND to instruct the WTRU 205 to perform measurements on neighboring cells of other RAT. Another alternative is for the eNB 285 to send some other RRC message. The WTRU 205 may also perform measurements and send the measurement reports to the eNB 285.

The eNB 285 may then either send 435 the UPLINK NAS TRANSPORT message to the MME 294 with the WTRU NAS message or, after receiving the notification of the originating CS service, send a RELOCATION REQUIRED message to the MME 294 with a description of the originating CS service.

The MME 294 then sends 440 a FORWARD RELOCATION REQUEST message to the Serving General Packet Radio Service (GPRS) Support Node (SGSN) 442. The SGSN 442 then sends 445 a PS HANDOVER REQUEST to the Basic Service Set (BSS) in response to the FORWARD RELOCATION REQUEST. The BSS then sends 450 a PS HANDOVER REQUEST ACKNOWLEDGE message back to the SGSN 442. The SGSN 442 then sends 455 the FORWARD RELOCATION RESPONSE message to the MME 294. The purpose of the procedure described in 440-455 is to accomplish resource reservation of the ongoing PS session in the LTE and the transfer of the relative security, MM and other contexts.

Once the MME 294 receives the FORWARD RELOCATION RESPONSE, the MME 294 sends 460 a RELOCATION COMMAND to the eNB 285. The MME 294 has the option to send this after reserving resources for the originating CS service with the target MSC/NB/BS. The MME 294 may also send a NAS message, such as a SERVICE REJECT message, to the WTRU 205.

The eNB 285 then sends 465 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name but which accomplishes a similar purpose. This RRC message may include an upper layer NAS message.

Upon receiving the Handover command, the RRC layer in the LTE AS 280 may provide 470 an indication of the fallback to CS cell to the NAS 235, which may also be used to send any received NAS message. The RRC layer in LTE access 280 may indicate 475 to the target access the parameters received in the handover. The target access may use these parameters to synchronize with the target cell. The target access may optionally confirm receiving the parameters/successful handover to the LTE access 280. The EMM entity 270 may indicate 480 to the MM layer 265 that the terminal is now operating in the CS domain in A/Gb or Iu mode, which may be accomplished via a primitive. The RRC or equivalent layer in target access may provide 485 an indication of the fallback to CS cell to the NAS 235.

The responses to the Handover command may be in any order and are not intended to be sequential and may be performed in any combination. The NAS 235 refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify of CS fallback command received/initiated/completed.

The WTRU NAS 235 is operating 490 in A/Gb or Iu mode and the MM layer 250 is active. As such, it may initiate call setup procedures as per usual with the access stratum of the target access (which is now the current access). The RRC, or equivalent layer of target (now current) access, may begin 495 its defined procedures for receiving a MO CS Call request.

Figure 5:
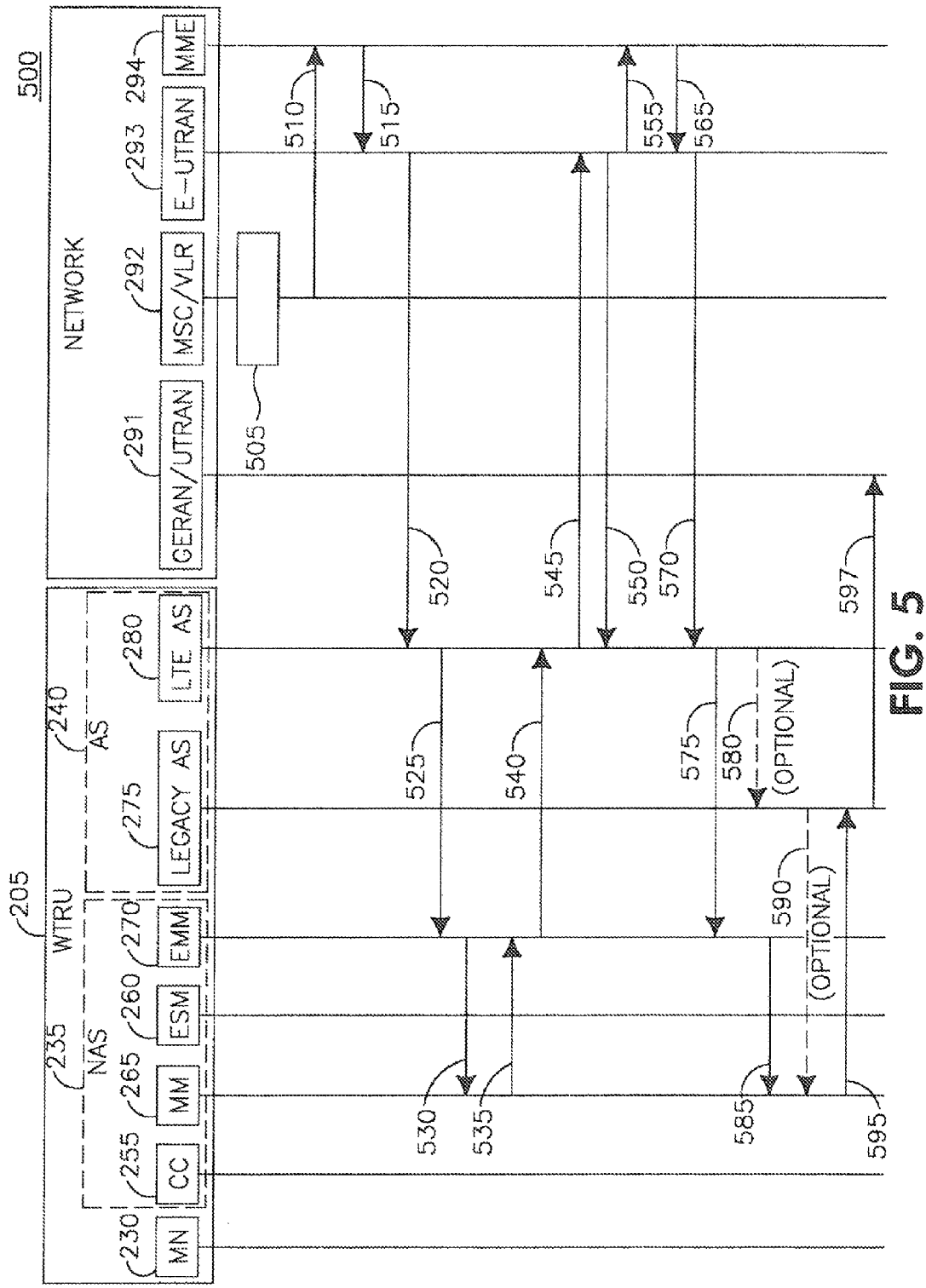
FIG. 5 is a signal flow diagram of an example call setup method for Mobile Terminating (MT) calls including the MT Call setup in Idle Mode.

FIG. 5 is a signal flow diagram of an example call setup method 500 for Mobile Terminating (MT) calls including the MT Call setup in Idle Mode. Referring to FIG. 5, an incoming page for CS service is received 505 at the MSC/VLR 292. The MSC/VLR 292 sends 510 a CS page over a Gs-like interface to the MME 294, which performed the last LA Update on behalf of the WTRU 205. The MME 294 then sends 515 a CS page request to eNB (E-UTRAN) 293 over a Si interface. The eNB 285 then pages 520 the WTRU 205. The page request may set the Domain Indicator to the CS domain, the cause for paging may indicate CS service, and the paging request may also provide a description of the service (e.g., conversational, background, etc.)

The LTE RRC then notifies 525 the EMM entity 270 in the NAS 235 about the incoming paging request and paging cause. The EMM entity 270 notifies 530 the MM entity 265 of the incoming page request for CS service. The MM entity 265 then responds 535, with a confirmation or a page response.

The LTE RRC may alternately, directly notify the MM entity 265 of the page request, if the paging cause is set to CS domain and/or if the page request is for incoming CS service. The MM entity 265 may then respond as defined in 535. It should be noted that any of the steps 525-535 may be optional and the timing of the steps may be different than that defined above.

Alternatively, the LTE AS 280 may initiate the cell reselection procedure and prioritize the selection priority of GERAN/UTRAN access to prioritize the RAT that supports CS service. Once the GERAN or UTRAN has been selected, the WTRU 205 may provide an indication of the fallback to CS to the NAS 235 as disclosed below, or skip to any step below. Note that this order of this optional alternative may be altered.

The EMM entity 270 then instructs 540 the LTE AS 280 to establish a PS signaling connection. This may be done by means of a primitive. This may also be done, for example, with a SERVICE REQUEST message or any other NAS message. The cause value of the Service Request may be set to Page Response.

As an alternative, the WTRU 205 may indicate to the network if it wishes to accept the incoming CS call in its Service Request or in any other NAS/RRC message in response to the page. This indication may be used by the network in its decision to handover the WTRU to a CS-capable RAT. This indication may be provided to the network after prompting the user about the incoming call and optionally warning the user that it will be in a lower speed access and receiving the user decision. If the user does not wish to be re-directed to the CS-capable RAT this will be indicated to the network in the message as defined above, and the network may choose not to move the WTRU 205 to a CS-capable RAT.

The LTE AS 280 will then initiate 545 procedures to acquire an RRC Connection. This may involve a RACH access and an RRC CONNECTION REQUEST. The LTE AS 280 may set the establishment cause in the RRC CONNECTION REQUEST to a value that indicates an originating CS service. The LTE AS 280 may also set the Domain Indicator IE in the RRC CONNECTION REQUEST to the CS domain, despite the fact that LTE is a PS only access. The establishment cause may provide details of the CS service which include, for example, "Terminating Streaming Call" or "Terminating Background Call".

Alternatively, a new RRC message called "EVENT NOTIFICATION" may be sent after an RRC Connection is established. This message indicates to the eNB 285 that a MT CS service request was received. The RRC may start a timer after sending this message. If the timer expires before a HANDOVER FROM E-UTRAN COMMAND, equivalent message, or any other message as defined below, is received the WTRU 205 may move to idle mode and re-select to a cell with CS service available.

Once the RRC CONNECTION REQUEST is received 550 with the cause value being set to "Terminating CS service" or some other message with a similar intent, the eNB 285 may send 555 an RRC CONNECTION SETUP message to setup Signaling Radio Bearers (SRBs). The SETUP message may include an indication of eNB-initiated Relocation for CS services. This indication may be a single bit. If this indication is present, or based on some other parameters, the RRC layer in the WTRU 205 may decide not to try and initiate an UL DIRECT TRANSFER procedure to send the upper layer NAS message. When the WTRU 205 receives the message, it may stop timer T300 and may start some other timer T1 that will help the WTRU 205 decide the duration of time it needs to wait before it returns to Idle mode.

Alternatively, the eNB 285 may send a RRC CONNECTION REJECT message or some other RRC message which includes, possibly, redirection info for the WTRU 205 indicating the target RAT, the target frequency, or the target cell, and the initiation of the relocation. The WTRU 205, upon receiving this message, may stop timer T300, move to Idle mode and re-select to the indicated RAT, frequency, or cell if indicated. At this point the WTRU RRC may send a RELOCATION COMMAND as will be discussed below.

In another alternative, a new RRC message called "EVENT NOTIFICATION RESPONSE" is sent which indicates to the WTRU 205 that EVENT NOTIFICATION was received. This RRC message may be called by some other name without changing the principle. When the WTRU 205 receives the Event notification response message it may stop timer T300 and start another timer that will help the WTRU decide the amount of time it needs to wait before it goes to Idle mode.

Any combination of the above alternatives may be used. If an RRC Connection and SRBs were setup, the eNB 285 may optionally initiate a measurement procedure so that it may determine to which cell to relocate the WTRU 205. Accordingly, the WTRU 205 may perform measurements and send the measurement reports to the eNB 285.

The eNB 285 then may either send the UPLINK NAS TRANSPORT message to the MME 294 with the WTRU NAS message or, after receiving notification of terminating CS service, a RELOCATION REQUIRED message to the MME 294 with optionally a description of the termination CS service.

The MME 294 sends 565 a RELOCATION COMMAND after optionally reserving resources for the terminating CS service with the target MSC, the target NB, or the target BS. Alternatively, the MME 294 may also send a NAS message, such as a SERVICE REJECT message, to the WTRU 205.

Next, the eNB 285 sends 570 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name but which accomplishes a similar purpose. This RRC message may include an upper layer NAS message.

In response to the Handover command, the RRC layer in the LTE AS 280 may provide 575 an indication of the fallback to CS cell to the NAS 235. This may also be used to send any received NAS message, may be accomplished via a primitive. The RRC layer in LTE access 280 may indicate 580 to the target access the parameters received in the handover. The target access may use these parameters to synchronize with the target cell. The target access may optionally confirm receiving the parameters or successful handover to the LTE access 280, which may be accomplished via a primitive. The EMM entity 270 then may indicate 585 to the MM layer 250 that the terminal is now operating in the CS domain in A/Gb or Iu mode. The RRC or equivalent layer in target access may provide 590 an indication of the fallback to CS cell to the NAS 235.

The example responses to the Handover command may be in any order and are not intended to be sequential and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify of CS fallback command received, initiated, or completed.

The WTRU NAS 235 is operating 595 in A/Gb or Iu mode and the MM layer 250 is active. As such, it may initiate call setup procedures as per usual with the access stratum of the target access, which is now the current access. The RRC, or equivalent layer of target (now current) access, begins 597 its defined procedures for receiving an MO CS Call request.

Figure 6:
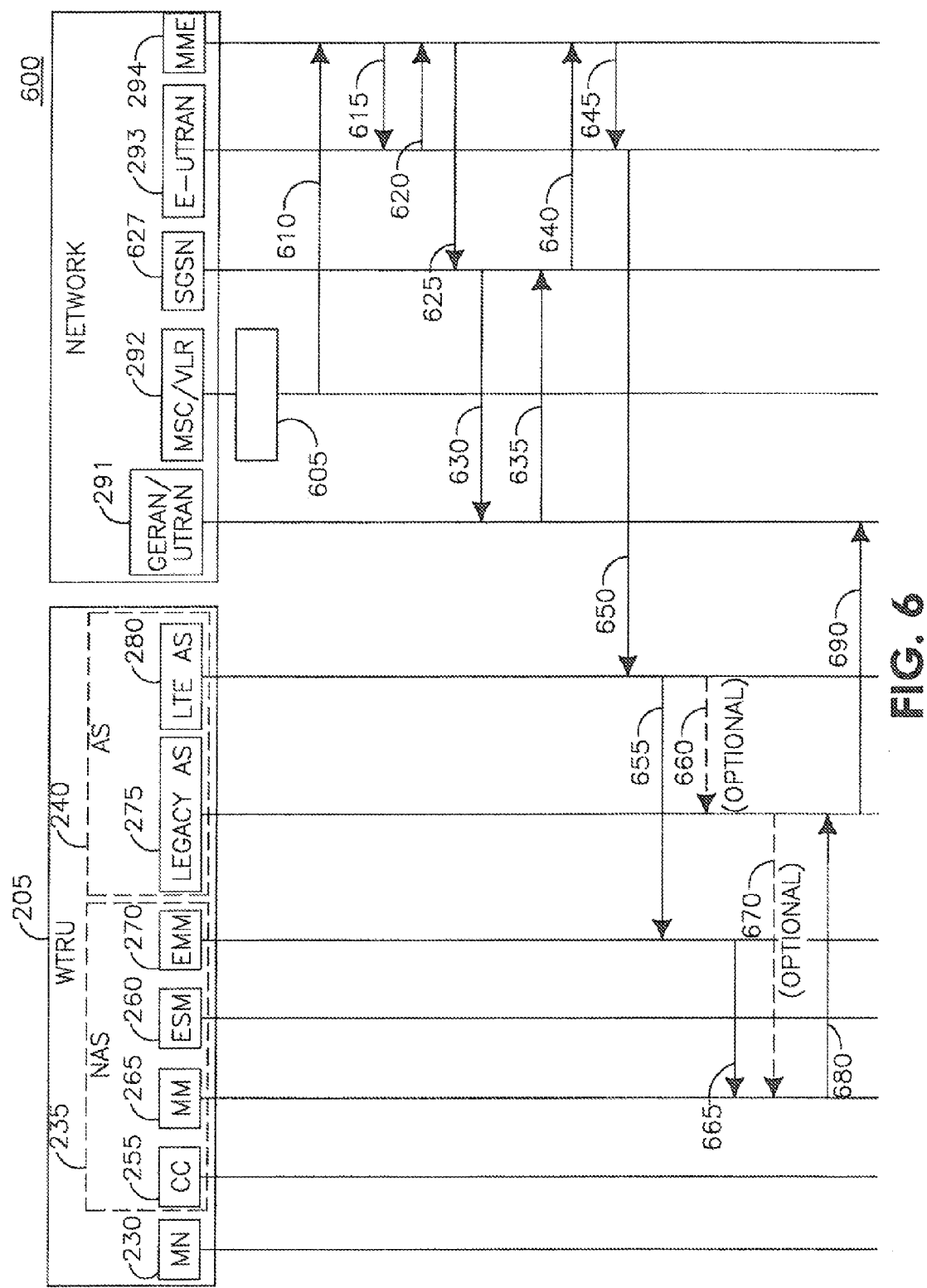
FIG. 6 is a signal flow diagram of an example method for MT Call setup in Active Mode with an ongoing packet session.

FIG. 6 is a signal flow diagram of an example method 600 for MT Call setup in Active Mode with an ongoing packet session. Referring to FIG. 6, the MSC/VLR 292 receives 605 an incoming page for CS service. In response to the received page, the MSC/VLR 292 sends 610 a CS page over the Gs-like interface to the MME 294 which performed last LA Update on behalf of WTRU 205. The MME 294 then sends 615 the CS page request to the eNB (E-UTRAN) 293 over an S1 interface. The eNB 285 then sends 620 the RELOCATION REQUIRED message to the MME 294 after having triggered a measurement report from the WTRU 205 to identify the target cell.

The MME 294 then sends 625 a FORWARD RELOCATION REQUEST message to the SGSN 627. The SGSN 627 sends 630 a PS HANDOVER REQUEST to the BSS/RNC. The BSS/RNC then sends 635 a PS HANDOVER REQUEST ACKNOWLEDGE message to the SGSN 627, which sends 640 the FORWARD RELOCATION RESPONSE message to the MME 294. The purpose of the procedure described in 625-640 is to accomplish resource reservation of the ongoing PS session in LTE and the transfer of the relative security, MM and other contexts.

The MME 294 then sends 645 a RELOCATION COMMAND. In response to the RELOCATION COMMAND, the eNB 285 then sends 650 a HANDOVER FROM E-UTRAN COMMAND to the WTRU 205. The Handover command may indicate to the WTRU 205 the target RAT, the target frequency, or the target cell. Alternatively, the eNB 285 may send an RRC message with a different name but which accomplishes a similar purpose. This RRC message may include an upper layer NAS message. The RRC message may have a cause value that indicates that reason for handover is a page received for terminating CS service request.

In response to receiving the Handover command, the RRC layer in the LTE AS 280 may provide 655 an indication of the fallback to CS cell to the NAS 235. This may also be used to send any received NAS message. It may indicate that the cause value is incoming CS service page request. The RRC layer in LTE access 280 may indicate 660 to the target access the parameters received in the handover. The target access may use these parameters to synchronize with the target cell. The target access may confirm receiving the parameters or successful handover to the LTE access 280. It may also indicate that the cause value is incoming CS service page request.

The EMM entity 270 may indicate 665 to the MM layer 265 that the terminal is now operating in the CS domain in A/Gb or Iu mode. This may be accomplished via a primitive, which indicates that the cause value is an incoming CS service page request. The RRC or equivalent layer in the target access may provide 670 an indication of the fallback to CS cell to the NAS 235. It also may indicate that the cause value is an incoming CS service page request.

The example responses to the Handover command may be in any order and are not intended to be sequential and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used as a notification of the CS fallback command received, initiated, or completed, and any cause values.

The WTRU NAS 235 is operating 680 in A/Gb or Iu mode and the MM layer 250 is active. It may initiate call setup procedures as per usual with the access stratum of the target access, which is now the current access. It may also indicate that the reason for the call setup request is CS page. The RRC or equivalent layer of the target (now current) access then begins 690 its defined procedures for receiving a MT CS Call request.

At any of the steps above, for example, upon receiving the HANDOVER FROM EUTRAN COMMAND, the WTRU 205 may indicate in any other NAS/RRC message to the network if it wishes to accept the incoming CS call. This indication may be used by the network in its decision to handover the WTRU 205 to a CS-capable RAT. This indication may be provided to the network after prompting the user about the incoming call and warning user that it will be in a lower speed access and receiving the user decision (e.g., okay, not okay). For example, if the user is not okay with being re-directed to CS-capable RAT this will be indicated to the network in the message (as defined above) and the network may choose not to move the WTRU 205 to a CS-capable RAT.

Figure 7:
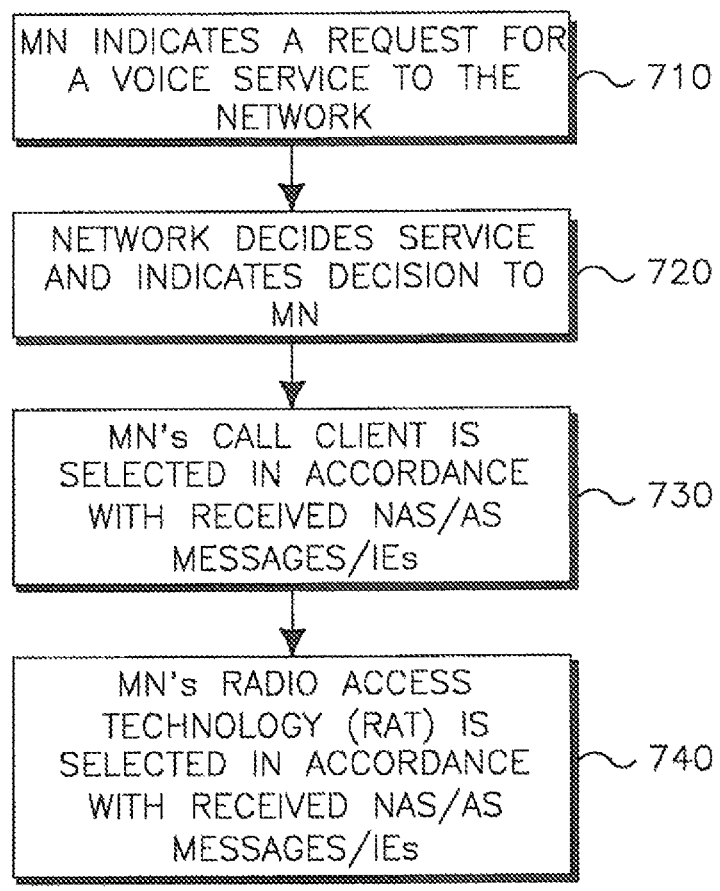
FIG. 7 is a flow diagram of an example method for handling voice client selection.

FIG. 7 is a flow diagram of an example method 700 for handling voice client selection. In accordance with this method 700, at the beginning, the MN utilizes the LTE NAS and LTE AS for sending its signaling messages. The MN indicates 710 a request for a voice service to the network utilizing NAS/AS messages/IEs. The network E-UTRAN/MME, upon consultation with the GERAN/UTRAN and/or MSC/VLR, determines 720 whether the voice call shall be serviced via the E-UTRAN (i.e., the PS VoIP client) or via the UTRAN/GERAN (i.e., the CS voice call client) and then indicates its decision to the MN utilizing NAS/AS messages/IEs. The MN's call client is selected 730 in accordance with the received NAS/AS messages/IEs. The MN's RAT is selected 740 in accordance with the received NAS/AS messages/IEs.

Figure 8:
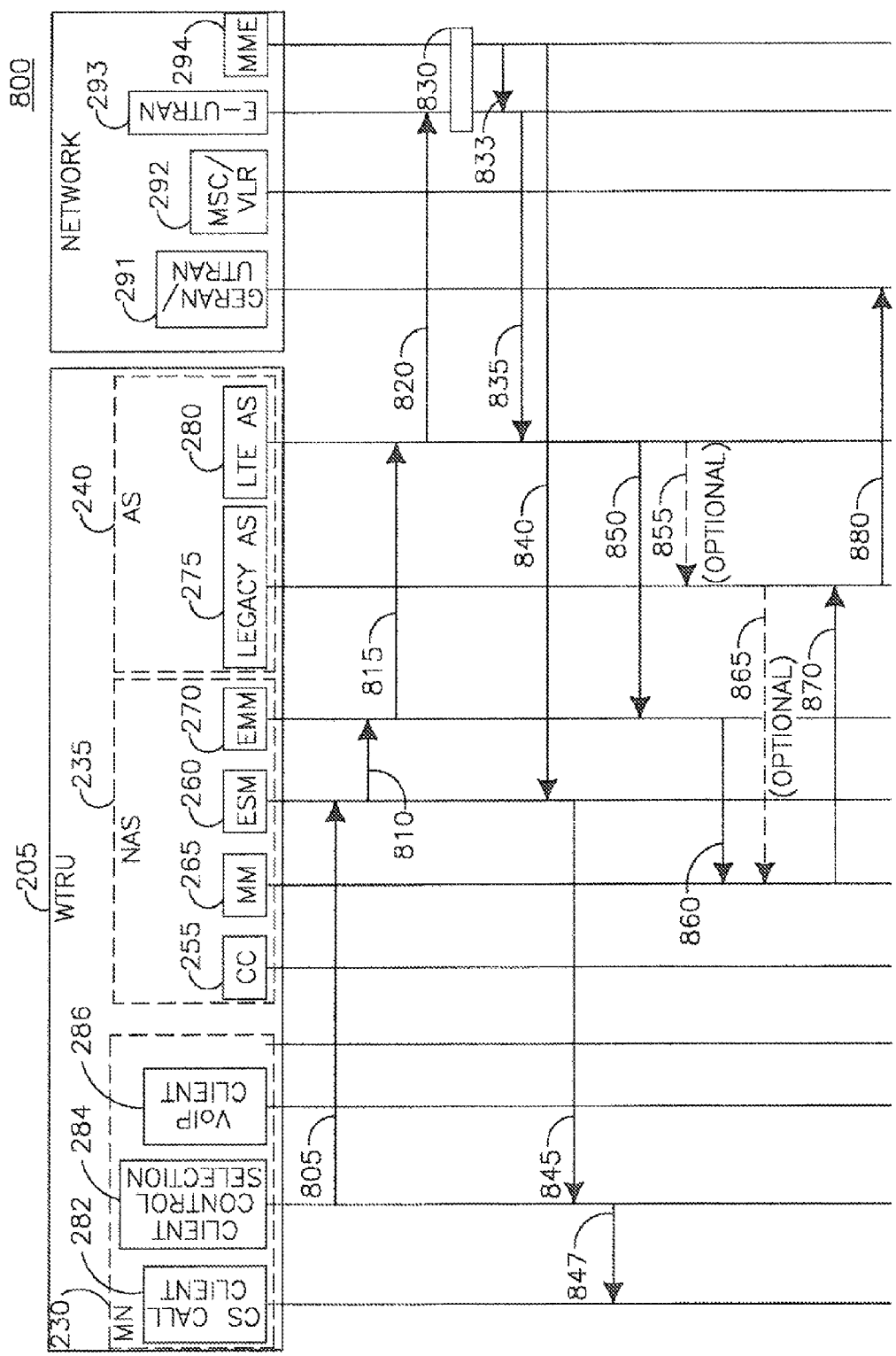
FIG. 8 is a signal flow diagram of an example MO Call setup in Idle Mode.

FIG. 8 is a signal flow diagram of an example method 800 for MO Call setup in Idle Mode. Referring to FIG. 8, an "SMREG-PDP-ACTIVATE-REQ" primitive (or its LTE equivalent) is sent 805 by the MN Client Control/Selection unit 284 to the ESM 260 over the SMREG-SAP (or its LTE equivalent) defined for the WTRU 205 to initiate a PDP Context Activation (or its LTE equivalent) for a MO PS service. A "GMMSM-UNITDATA-REQ" primitive (or its LTE equivalent) is then sent 810 by the ESM 260 to the EMM 270 over the GMMSM-SAP which includes a PDP Context Activation Request (or its LTE equivalent).

The EMM 270 then may send 815 a Service Request or any other NAS EMM/ESM message with a similar intent to establish a S1 signaling connection with the MME 294. A new cause value is included in the message sent that may indicate "voice service" or some other cause value with a similar intent. The EMM 270 then will provide this message to the LTE AS 280 after performing ciphering and/or integrity protection of the EMM message if necessary. The EMM 270 may also provide the LTE AS 280 with an indication of the originating voice service separate from the NAS message being sent and may also provide a description, for example whether it is conversational or streaming.

The LTE AS 280 will then initiate 820 procedures to acquire an RRC Connection. This may involve a RACH access and an RRC CONNECTION REQUEST. In this example, the LTE AS 280 may set the establishment cause in the RRC CONNECTION REQUEST to a value that indicates an originating conversational voice service. The establishment cause may provide details of the voice service including "Originating Streaming Call" or "Originating Background Call". The RRC CONNECTION REQUEST message may include an information element that indicates whether the WTRU 205 supports CS Fallback.

Alternatively, an RRC message called "EVENT NOTIFICATION" may be sent by the WTRU 205 after the RRC connection is established. It indicates to the eNB 285 that an MO voice service request was received. This RRC message may be called by some other name without changing the principle. The RRC may start a timer after sending this message. If the timer expires before a HANDOVER FROM E-UTRAN COMMAND or equivalent message, or any other message as defined below, is received, the WTRU 205 may move to idle mode and re-select to a cell with CS service available.

Once the RRC CONNECTION REQUEST is received with the cause value being set to "Originating voice service" or a cause with a similar intent, the network (i.e., the E-UTRAN 293 and/or the MME 294) decides 830 whether the voice service shall be taken in the CS domain (i.e., via the UTRAN/GERAN RAT) or in the PS domain (i.e., via the E-UTRAN RAT). Such determination may be based on operator or user preferences, or other criteria, such as load balancing criteria, or RAT coverage criteria, or based on whether other PS services will be used or are in usage by the WTRU 205 or not. The MME 294 may then send a relocation command 833.

In response to the network decision, the eNB 285 may then send 835 an RRC CONNECTION SETUP message to setup SRBs. The SETUP message may include an indication of eNB- initiated Relocation for CS services. This indication may be 1 bit. If this indication is present, or based on some other parameters, the RRC layer in the WTRU may decide not to try and initiate an UL DIRECT TRANSFER procedure to send the upper layer NAS message. The WTRU 205, when it receives the message may stop timer T300 and may start some other timer T1, which will help the WTRU 205 decide the duration of time it needs to wait before it goes back to idle.

Alternatively, the eNB 285 may send an RRC CONNECTION REJECT message or some other RRC message (new or different) which includes, possibly, redirection info for the WTRU 205 indicating the target RAT, the target frequency, or the target cell, and may also indicate initiation of the relocation. The WTRU 205 on receiving this message would stop timer T300, move to Idle mode and re-select to the indicated RAT, frequency, or cell if indicated. At this point the WTRU RRC may send a notification to the Client Control/Selection unit 284.

In another alternative, RRC message called "EVENT NOTIFICATION RESPONSE" indicates to the WTRU 205 that EVENT NOTIFICATION was received. This RRC message may be called by some other name without changing the principle. When the WTRU 205 receives the EVENT NOTIFICATION RESPONSE message it may stop timer T300 and start another timer that will help the WTRU 205 decide the amount of time it needs to wait before it switches to Idle mode.

Any combination of the above alternatives may be used. If an RRC Connection and SRBs were setup the eNB 285 may optionally initiate a measurement procedure so that it may determine to which cell to relocate the WTRU 205. Accordingly, the WTRU 205 may perform measurements and send the measurement reports to the eNB 285.

The MME 294 then may send 840 an NAS message or a NAS Information Element (IE) to inform the WTRU NAS 235 (e.g. the ESM 260) of whether the WTRUs CS Call Client or the VoIP (i.e. PS) Client should be utilized for the voice service. The WTRU NAS/ESM 260 notifies 845 a Client Control/Selection unit 284 via a new primitive that indicates which client should be used for voice. The Client Control/Selection unit 284 then notifies 847 the selected voice client accordingly. In FIG. 8, it is assumed that the CS Call Client is selected. Alternatively, the WTRU NAS/ESM 260 may notify the selected voice client directly, without interfacing with a Client Control/Selection function 284.

If the network decided to service the voice call in the CS network, for example via UTRAN/GERAN, the RRC layer in the LTE AS 280 may provide an indication 850 of the fallback to CS cell to the NAS 235. This may also be used to send any received NAS message. The RRC layer in the LTE access 280 may indicate 855 to the target access the parameters received in the handover. The target access may use these parameters to synchronize with the target cell. The target access may optionally confirm receiving the parameters or successful handover to the LTE access 280. This may be accomplished via a primitive. The EMM entity 270 then may indicate 860 to the MM layer 265 that the terminal is now operating in the CS domain in A/Gb or Iu mode. This may be accomplished via a primitive. The RRC or equivalent layer in target access may provide 865 an indication of the fallback to CS cell to the NAS 235. This may be accomplished via a primitive.

The example responses to the network decision may be in any order and are not intended to be sequential and may be performed in any combination. The NAS layer 235 in these steps refers specifically to any or both of the EMM 270 and MM 265 entities. It may also be possible to define primitives between the LTE RRC and the MM sub-layer 250 and the EMM entity 270 and the RRC equivalent of the target. These primitives may be used to notify of CS fallback command received, initiated, or completed.

The WTRU NAS 235 is operating 870 in A/Gb or Iu mode and the MM layer 250 is active. It may then initiate call setup procedures as per usual with the access stratum of the target access, which is now the current access. The RRC or equivalent layer of the target (now current) access begins 880 its defined procedures for receiving a MO CS Call request.

Similar concepts to the ones illustrated previously may be supported and applied to the following by combining the concepts illustrated in the corresponding prior sections. These concepts, for example, include MO Call setup in Active Mode with ongoing packet session, MT Call setup in Idle Mode, and MT Call setup in Active Mode with ongoing packet session.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (WTRU), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU), comprising:
   a transmitter configured to transmit a service request to an Evolved Universal Mobile Telecommunications System (UMTS) Terrestrial Radio Access Network (E-UTRAN); and
   a processor, coupled to the transmitter, the processor configured to implement a Non-Access Stratum (NAS) layer to:
   determine to request a Circuit Switched (CS) fallback;
   generate, after the determining to request the CS fallback, the service request including a request to perform the CS fallback and CS service information; and
   receive, from another layer of the WTRU, an indication of a mode change to one of: an A/Gb mode or an Iu mode, as a notification of completion of the CS fallback.

2. The WTRU of claim 1, wherein the processor is further configured to implement an Access Stratum (AS) layer, the AS layer comprising:
   a legacy AS; and
   a Long Term Evolution (LTE) AS, wherein the LTE AS is configured to receive the service request from the NAS layer, generate a Radio Resource Control (RRC) message including the service request, and receive a handover command.

3. The WTRU of claim 2, wherein:
   the NAS layer comprises a Mobility Management (MM) unit configured to notify an Evolved Packet System (EPS) Mobility Management (EMM) of a CS call; and
   the EMM is configured to send a notification of the service request to the AS layer and send an indication to the MM unit that the WTRU is operating in a CS domain.

4. The WTRU of claim 2, wherein the legacy AS is configured to send the indication of the mode change to one of: the A/Gb mode or the Iu mode to the NAS layer on a condition that the legacy AS receives a handover parameter from the LTE AS.

5. The WTRU of claim 2, wherein the LTE AS is configured to set an establishment cause in the RRC message to a value that indicates an originating CS service.

6. The WTRU of claim 5, wherein the LTE AS is configured to provide details of the originating CS service in the establishment cause.

7. The WTRU of claim 1, wherein the NAS layer is configured to generate the service request on a condition that the WTRU is attached to a CS domain.

8. The WTRU of claim 1, wherein the NAS layer receives the indication of the mode change from an S1 mode to one of: the A/Gb mode or the Iu mode.

9. The WTRU of claim 1, wherein the service request including the request to perform the CS fallback is invoked on a condition that the WTRU is currently attached to the E-UTRAN.

10. The WTRU of claim 1, wherein the NAS layer is further configured to determine a domain to service originating and terminating voice calls of the WTRU.

11. The WTRU of claim 1, wherein the CS service information indicates a service type associated with the CS fallback.

12. A method for circuit switched (CS) fallback performed by a wireless transmit/receive unit (WTRU) comprising a transmitter, and a processor coupled to the transmitter, the processor configured to implement a Non-Access Stratum (NAS) layer, the method comprising:
   determining, by the NAS layer, to request a CS fallback;
   after the determining to request the CS fallback, generating, by the NAS layer, a service request including a request to perform the CS fallback and CS service information;
   transmitting the service request, by the transmitter, to an Evolved Universal Mobile Telecommunications System (UMTS) Terrestrial Radio Access Network (E-UTRAN); and
   receiving, by the NAS layer from another layer of the WTRU, an indication of a mode change to one of: an A/Gb mode or an Iu mode, as a notification of completion of the CS fallback.

13. The method of claim 12, wherein the generating of the service request comprises generating the service request on a condition that the WTRU is attached to a CS domain.

14. The method of claim 12, wherein the mode change is from an S1 mode to one of: the A/Gb mode or the Iu mode.

15. The method of claim 12, wherein the service request including the request to perform the CS fallback is invoked on a condition that the WTRU is currently attached to the E-UTRAN.

16. The method of claim 12, further comprising determining, by the NAS layer, a domain to service originating and terminating voice calls of the WTRU.

17. The method of claim 12, wherein the CS service information indicates a service type associated with the CS fallback.

18. A wireless transmit/receive unit (WTRU), comprising:
   a transmitter;
   a receiver; and
   a processor, coupled to the transmitter and the receiver, configured to implement a Non-Access Stratum (NAS),
   wherein the NAS is configured to:
      determine whether to request a Circuit Switched (CS) fallback; and
      responsive to determining to request the CS fallback, generate a service request including a request to perform the CS fallback, wherein the service request includes CS service information,
   wherein the transmitter is configured to transmit the service request to an Evolved Universal Mobile Telecommunications System (UMTS) Terrestrial Radio Access Network (E-UTRAN), and
   wherein the receiver is configured to receive a Radio Resource Control (RRC) message including redirection information in response to the service request.

19. The WTRU of claim 18, wherein the redirection information includes a target Radio Access Technology (RAT), a target cell, or a target frequency.

20. The WTRU of claim 18, wherein the NAS is configured to generate the service request on a condition that the WTRU is attached to a CS domain.

* * * * *

UNITED STATES PATENT AND TRADEMARK OFFICE
CERTIFICATE OF CORRECTION

PATENT NO. : 9,848,358 B2
APPLICATION NO. : 14/069963
DATED : December 19, 2017
INVENTOR(S) : Shankar Somasundaram et al.

It is certified that error appears in the above-identified patent and that said Letters Patent is hereby corrected as shown below:

In the Specification

In Column 1, Line 9, change "12/408,028" to --12/408,028,--.

In Column 1, Line 11, change "61/038,701 filed" to --61/038,701, filed--.

In Column 9, Line 60, change "Si" to --S1--.

Signed and Sealed this
Fifth Day of November, 2019

Andrei Iancu
*Director of the United States Patent and Trademark Office*